United States Patent

Kim

(10) Patent No.: US 12,026,109 B2
(45) Date of Patent: Jul. 2, 2024

(54) OPERATING METHOD OF TRANSACTION ACCELERATOR, OPERATING METHOD OF COMPUTING DEVICE INCLUDING TRANSACTION ACCELERATOR, AND COMPUTING DEVICE INCLUDING TRANSACTION ACCELERATOR

(71) Applicant: Samsung Electronics Co., Ltd., Suwon-si (KR)

(72) Inventor: Sangwoo Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 128 days.

(21) Appl. No.: 17/410,115

(22) Filed: Aug. 24, 2021

(65) Prior Publication Data

US 2022/0188251 A1    Jun. 16, 2022

(30) Foreign Application Priority Data

Dec. 16, 2020   (KR) ........................ 10-2020-0176815

(51) Int. Cl.
*G06F 13/20*       (2006.01)
*G06F 9/50*        (2006.01)

(52) U.S. Cl.
CPC ............ *G06F 13/20* (2013.01); *G06F 9/5016* (2013.01)

(58) Field of Classification Search
CPC ............................. G06F 13/20; G06F 9/5016
See application file for complete search history.

(56) References Cited

U.S. PATENT DOCUMENTS

| 5,572,701 A | | 11/1996 | Ishida et al. | |
|---|---|---|---|---|
| 5,809,263 A | * | 9/1998 | Farmwald | G11C 7/22 711/E12.089 |
| 5,961,623 A | * | 10/1999 | James | G06F 13/4036 710/240 |
| 6,256,693 B1 | * | 7/2001 | Platko | G06F 13/4278 710/110 |
| 6,587,868 B2 | * | 7/2003 | Porterfield | G06F 13/404 710/114 |
| 7,688,838 B1 | * | 3/2010 | Aloni | G06F 13/385 370/395.7 |

(Continued)

FOREIGN PATENT DOCUMENTS

| CN | 111984562 A | * 11/2020 | ......... G06F 13/1605 |
|---|---|---|---|
| JP | H09-081500 A | 3/1997 | |

(Continued)

OTHER PUBLICATIONS

Translation of JP-6416488-B2 (Year: 2018).*
Translation of CN-111984562-A (Year: 2020).*

*Primary Examiner* — Henry Tsai
*Assistant Examiner* — John B Roche
(74) *Attorney, Agent, or Firm* — Harness, Dickey & Pierce, P.L.C.

(57) ABSTRACT

A transaction accelerator may be connected between at least one host device and a bus, and a method of operating the transaction accelerator may include receiving a first transaction request from the at least one host device, transmitting the first transaction request to the bus, and transmitting a first transaction response corresponding to the first transaction request to the at least one host device, in response to the transmitting the first transaction request to the bus.

19 Claims, 19 Drawing Sheets

(56) References Cited

U.S. PATENT DOCUMENTS

| | | | |
|---|---|---|---|
| 8,255,673 B2 | 8/2012 | Kershaw et al. | |
| 8,706,974 B2 | 4/2014 | Moyer | |
| 2002/0165942 A1 | 11/2002 | Ulrich et al. | |
| 2006/0015667 A1* | 1/2006 | Kunjan | G06F 13/4273 710/107 |
| 2019/0379553 A1* | 12/2019 | Sindhu | H04L 12/1868 |
| 2020/0371917 A1* | 11/2020 | Chachad | G06F 9/38 |

FOREIGN PATENT DOCUMENTS

| | | | |
|---|---|---|---|
| JP | 2007-206924 A | | 8/2007 |
| JP | 6416488 B2 | * | 10/2018 |

* cited by examiner

OPERATING METHOD OF TRANSACTION ACCELERATOR, OPERATING METHOD OF COMPUTING DEVICE INCLUDING TRANSACTION ACCELERATOR, AND COMPUTING DEVICE INCLUDING TRANSACTION ACCELERATOR

CROSS-REFERENCE TO RELATED APPLICATIONS

This U.S. non-provisional application claims the benefit of priority under 35 U.S.C. § 119 to Korean Patent Application No. 10-2020-0176815, filed on Dec. 16, 2020, in the Korean Intellectual Property Office, the disclosure of which are incorporated by reference herein in its entirety.

BACKGROUND

Various example embodiments of the inventive concepts described herein relate to an electronic device, and more particularly, relate to a method of operating a transaction accelerator which increases a transaction speed of a processor, a method of operating a computing device including the transaction accelerator, and/or a computing device including the transaction accelerator, etc.

A computing device, such as a mobile device, may include various processors and/or a plurality of processors. The processors may be used for different purposes. Desired and/or required performances of the processors may be different depending on the purposes of the respective processors. For example, in the case where a relatively low performance is desired and/or required, a low-cost and low-performance processor may be used to make costs for manufacturing the computing device lower.

The low-cost and low-performance processor may make it possible to reduce costs for manufacturing the computing device. However, in a specific environment, the low-cost and low-performance processor may act as a bottleneck limiting the overall performance of the computing device.

SUMMARY

Various example embodiments of the inventive concepts provide an operating method of a transaction accelerator making a transaction speed of a processor higher (e.g., increasing a bandwidth of the processor, increasing a throughput of the processor, etc.), an operating method of a computing device including the transaction accelerator, and/or a computing device including the transaction accelerator.

According to at least one example embodiment, an operation method of a transaction accelerator connected between at least one host device and a bus includes receiving a first transaction request from the at least one host device, transmitting the first transaction request to the bus, and transmitting a first transaction response corresponding to the first transaction request to the at least one host device in response to the transmitting the first transaction request to the bus.

According to at least one example embodiment, an operating method of a computing device which includes at least one processor, a transaction accelerator, and a plurality of peripheral devices includes transmitting, by the at least one processor, a first read transaction request to the transaction accelerator, transmitting, by the transaction accelerator, a first read transaction response to the at least one processor, the first read transaction response corresponding to the first read transaction request, transmitting, by the at least one processor, a second read transaction request to the transaction accelerator in response to the first read transaction response, transmitting, by the transaction accelerator, a second read transaction response corresponding to the second read transaction request to the at least one processor, and transmitting, by the transaction accelerator, the first read transaction request and the second read transaction request to at least one peripheral device of the plurality of peripheral devices.

According to at least one example embodiment, a computing device includes a bus, a plurality of peripheral devices connected to the bus, and a central processing unit (CPU) connected to the bus, the CPU configured to control the plurality of peripheral devices through the bus. The CPU includes at least one processor core, and a transaction accelerator including two or more transaction slots, the transaction accelerator is configured to receive a first transaction request from the at least one processor core, transmit a first transaction response to the at least one processor core in response to the received first transaction request, transfer the first transaction request to the bus, and store information related to the first transaction request in one of the two or more transaction slots until the first transaction request is completed.

BRIEF DESCRIPTION OF THE FIGURES

The above and other objects and features of the inventive concepts will become apparent by describing in detail example embodiments thereof with reference to the accompanying drawings.

DETAILED DESCRIPTION

Below, various example embodiments of the inventive concepts may be described in detail and clearly to such an extent that one skilled in the art easily may carry out the inventive concepts.

Figure 1:
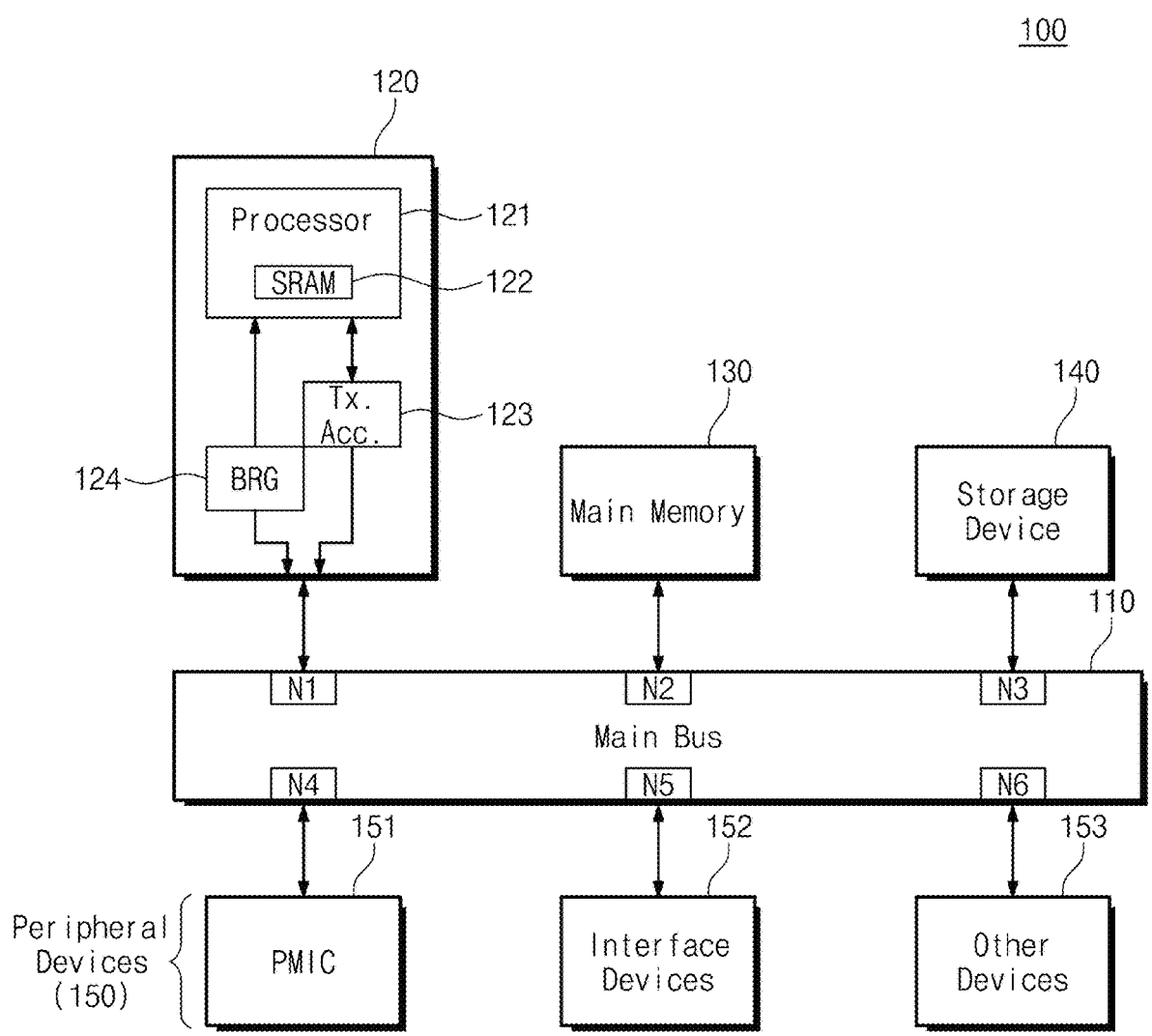
FIG. 1 illustrates a computing device according to at least one example embodiment of the inventive concepts.

FIG. 1 illustrates a computing device 100 according to at least one example embodiment of the inventive concepts. Referring to FIG. 1, the computing device 100 may include a main bus 110, at least one central processing unit (CPU) 120, a main memory 130, at least one storage device 140, and/or a plurality of peripheral devices 150, etc., but the example embodiments are not limited thereto, and for example, the computing device 100 may include a greater or lesser number of constituent elements. For example, the computing device 100 may include a plurality of CPUs, a plurality of main memory, a plurality of storage devices, and/or a single peripheral device, etc.

The main bus 110 may provide one or more channels between the components of the computing device 100. For example, the main bus 110 may include first to sixth nodes N1 to N6 configured to be connected with the remaining components of the computing device 100, but is not limited thereto. The main bus 110 may provide channels between the first to sixth nodes N1 to N6, but is not limited thereto. The main bus 110 may use some nodes of the first to sixth nodes N1 to N6 as master nodes (e.g., primary nodes, etc.) and may use the remaining nodes of the first to sixth nodes N1 to N6 as slave nodes (e.g., secondary nodes, etc.), but the example embodiments are not limited thereto.

The central processing unit (CPU) 120 may be connected with the first node N1 of the main bus 110. The CPU 120 may perform at least one transaction operation with the main bus 110 and/or with any other components of the computing device 100 through the main bus 110. The transaction operation may include, for example, transmitting, by the CPU 120, a transaction request to the main bus 110, and/or receiving, by the CPU 120, a transaction response corresponding to the transaction request from the main bus 110, but the example embodiments are not limited thereto. The transaction operation may include a read transaction operation, a write transaction operation, an erase transaction operation, etc.

The CPU 120 may include processing circuitry, such as at least one processor 121, a transaction accelerator 123 (marked as Tx. ACC. in FIG. 1), and/or a bridge 124 (marked by BRG in FIG. 1), etc., but is not limited thereto, and for example, may include a greater or lesser number of constituent components, such as internal memory (e.g., cache memory), etc. The processor 121 may be at least one core circuit (e.g., at least one processor core, etc.) of the CPU 120. The processor 121 may initiate various kinds of transaction operations and may perform various operations. According to some example embodiments, the CPU 120 (e.g., processing circuitry) may include hardware, such as processors, processor cores, logic circuits, storage devices, etc.; a hardware/software combination such as at least one processor core executing software and/or executing any instruction set, etc.; or a combination thereof. For example, the processing circuitry more specifically may include, but is not limited to, a field programmable gate array (FPGA), a programmable logic unit, an application-specific integrated circuit (ASIC), s System-on-Chip (SoC), etc.

The processor 121 may perform a given and/or desired number of transaction operations in parallel. For example, the processor 121 may transmit a plurality of transaction requests to the main bus 110 as much as the given number, until a transaction response is received from the main bus 110. The given and/or desired number of parallel transaction operations may be the number of pending transaction operations that the processor 121 is capable of managing at the same time, etc.

The processor 121 may include a static random access memory (SRAM) 122, but is not limited thereto. The SRAM 122 may include various sections, such as a section used as a cache memory by the processor 121, a section used as a data memory by the processor 121, and/or a section used as a working memory of the processor 121, etc. The SRAM 122 may be divided into two or more physical sections, or may be included in one physical section.

The transaction accelerator 123 may increase (and/or expand) the number of parallel transaction operations of the processor 121. For example, when the processor 121 supports only a single transaction operation, the transaction accelerator 123 may support the processor 121 such that the CPU 120 performs two or more parallel transaction operations. When the processor 121 supports two or more parallel transaction operations, the transaction accelerator 123 may support the processor 121, such that the CPU 120 performs a greater number of parallel transaction operations.

In at least one example embodiment, when a communication protocol of the processor 121 and a communication protocol of the main bus 110 are different, the transaction accelerator 123 may support conversion (and/or translation) between the different communication protocols, etc.

When the communication protocol of the processor 121 and the communication protocol of the main bus 110 are different, the bridge 124 may support conversion (and/or translation) between the different communication protocols, etc. When the communication protocol of the processor 121 and the communication protocol of the main bus 110 are the same, the bridge 124 may be omitted (or may not be included).

In at least one example embodiment, the processor 121 may determine whether to communicate with the main bus 110 through the transaction accelerator 123 or whether to communicate with the main bus 110 through the bridge 124. When the processor 121 communicates with the main bus 110 through the transaction accelerator 123, the number of parallel transaction operations of the CPU 120 may be more than the number of parallel transaction operations of the processor 121, but the example embodiments are not limited thereto.

When the processor 121 communicates with the main bus 110 through the bridge 124, the number of parallel transaction operations of the CPU 120 may be the same as the number of parallel transaction operations of the processor 121, but the example embodiments are not limited thereto. In at least one example embodiment, each transaction operation may include a target address (e.g., destination address, destination component address, etc.), but is not limited thereto. A target address may indicate a specific location in the main bus 110, and/or an address associated with one of the components connected with the main bus 110 (and/or one of internal components included in the one component), but is not limited thereto.

The processor 121 may determine whether to communicate with the main bus 110 through the transaction accelerator 123 or whether to communicate with the main bus 110 through the bridge 124, based on, for example, a setting included in a portion of a target address, e.g., setting at least one including the most significant bit thereof, etc., but not limited thereto.

The main memory 130 may be connected with, e.g., the second node N2 of the main bus 110, but is not limited thereto. The main memory 130 may be used as a working memory, a code memory, and/or a data memory of the computing device 100, etc., but is not limited thereto. The main memory 130 may include, for example, a dynamic random access memory (DRAM), a storage class memory (SCM), etc.

The storage device 140 may be connected with, e.g., the third node N3 of the main bus 110, but is not limited thereto. The storage device 140 may be an auxiliary storage device, long term storage device, and/or mass storage device of the computing device 100, but is not limited thereto. The storage device 140 may be end storage that stores codes (e.g., computer readable instructions, program code, etc.) and/or data necessary to operate the computing device 100 and user data generated by using the computing device 100. Desired and/or necessary information of the codes or the data stored in the storage device 140 may be loaded and used onto the main memory 130 by the CPU 120.

The storage device 140 may be implemented in one of various forms such as a solid state drive (SSD), a hard disk drive (HDD), an optical disk drive (ODD), and/or a removable storage device, etc.

The one or more peripheral devices 150 may be connected to the main bus 110 to expand functionality of the computing device 100 and/or to improve the performance of the computing device 100, etc. For example, the peripheral devices 150 may include a power management integrated circuit (PMIC) 151 connected with, e.g., the fourth node N4 of the main bus 110, etc. The PMIC 151 may adjust various parameters, such as levels of voltages (e.g., voltage levels, etc.) supplied to the components of the computing device 100 and/or frequencies of clock signals, etc., to control power consumption of the computing device 100. The PMIC 151 may allow the computing device 100 to enter a power saving mode from a normal mode and/or to wake up in the power saving mode so as to exit to the normal mode, but is not limited thereto.

The one or more peripheral devices 150 may also include interface devices 152 connected with, e.g., the fifth node N5 of the main bus 110, but is not limited thereto. The interface devices 152 may include a user input interface(s), which receives information from the user, such as a keyboard, a keypad, a mouse, a touch panel, a microphone, a camera, and/or a sensor, etc. The interface devices 152 may include a user output device(s), which conveys information to the user, such as a monitor, a touchscreen, a speaker, a projector, and/or an actuator, etc.

The peripheral devices 150 may include other devices 153 connected with, e.g., the sixth node N6 of the main bus 110. The other devices 153 may be various elements that are coupled with the main bus 110 to improve the performance of the computing device 100 and/or to expand a function of the computing device 100, etc., but the example embodiments are not limited thereto.

In at least one example embodiment, to convey the technical ideas and/or benefits of one or more of the example embodiments briefly, it is assumed that the number of parallel transaction operations that the processor 121 supports is "1" for the sake of brevity and clarity. However, the example embodiments of the inventive concepts are not limited to a processor supporting one parallel transaction operation and may support two or more parallel transaction operations.

Figure 2:
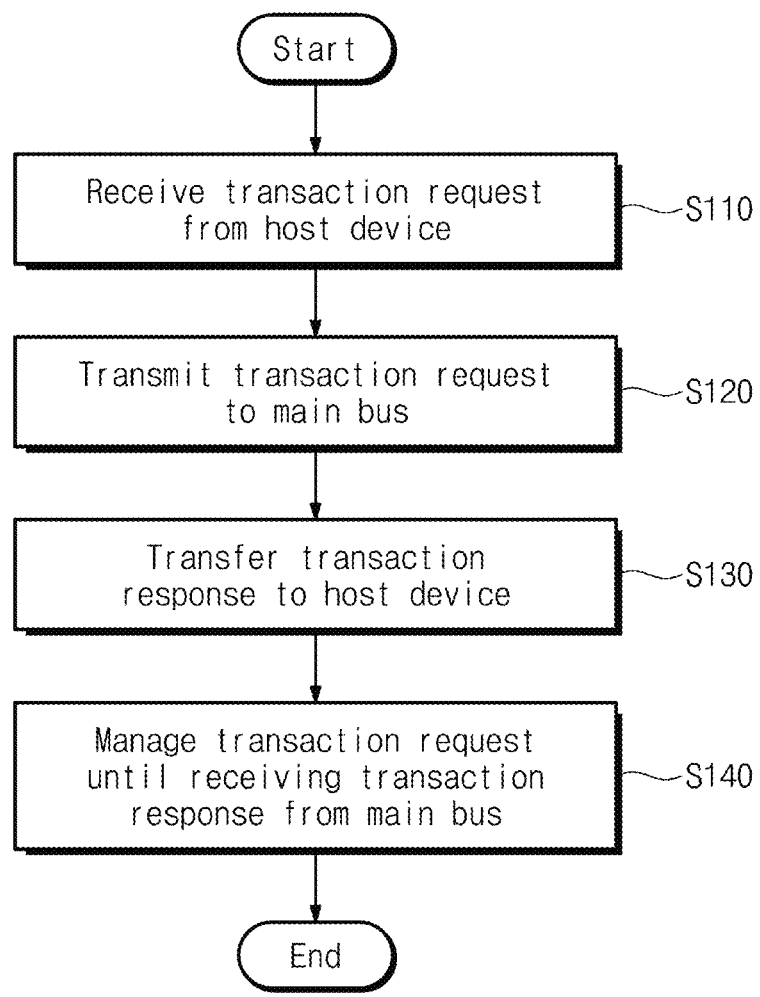
FIG. 2 illustrates an operating method of a transaction accelerator of a computing device according to at least one example embodiment of the inventive concepts.

FIG. 2 illustrates an operating method of the transaction accelerator 123 of the computing device 100 according to at least one example embodiment of the inventive concepts. Referring to FIGS. 1 and 2, in operation S110, the transaction accelerator 123 may receive at least one transaction request from at least one host device. The host device may be the processor 121 in FIG. 1, but is not limited thereto.

In operation S120, the transaction accelerator 123 may transmit the transaction request to the main bus 110. In at least one example embodiment, when a communication protocol of the processor 121 and a communication protocol of the main bus 110 are different, the transaction accelerator 123 may convert the transaction request so as to be transmitted to the main bus 110, but the example embodiments are not limited thereto.

In operation S130, the transaction accelerator 123 may transmit the transaction response to the host device in response to the received transaction request to the main bus 110. The transaction response may notify the processor 121 of a status of the transaction operation according to and/or based on the transaction request received from the processor 121, such as whether the transaction operation has been completed and/or whether any error has occurred, etc.

In operation S140, after transmitting the transaction response to the processor 121, the transaction accelerator 123 may manage the transaction request until a transaction response is received from the main bus 110.

As described above, the transaction accelerator 123 may transmit the transaction response to the processor 121 in response to (and/or after and/or immediately after) receiving the transaction request from the processor 121. The processor 121 may identify the completion of the transaction operation depending on and/or based on the transaction response. As the completion of the transaction operation is identified, the processor 121 may perform a next transaction operation. That is, before the transaction operation initiated by the processor 121 is completed, the processor 121 may initiate another at least one transaction operation, etc. Accordingly, the number of parallel transaction operations of the CPU 120 may be considered as being greater than the number of parallel transaction operations of the processor 121.

According to at least one example embodiment, the transaction operation initiated by the processor 121 may be managed by the transaction accelerator 123, but is not limited thereto. The transaction accelerator 123 may monitor whether a transaction response corresponding to the transaction request transmitted to the main bus 110 is received. Accordingly, the completion of the transaction operation initiated by the processor 121 may be secured and/or confirmed.

Figure 3:
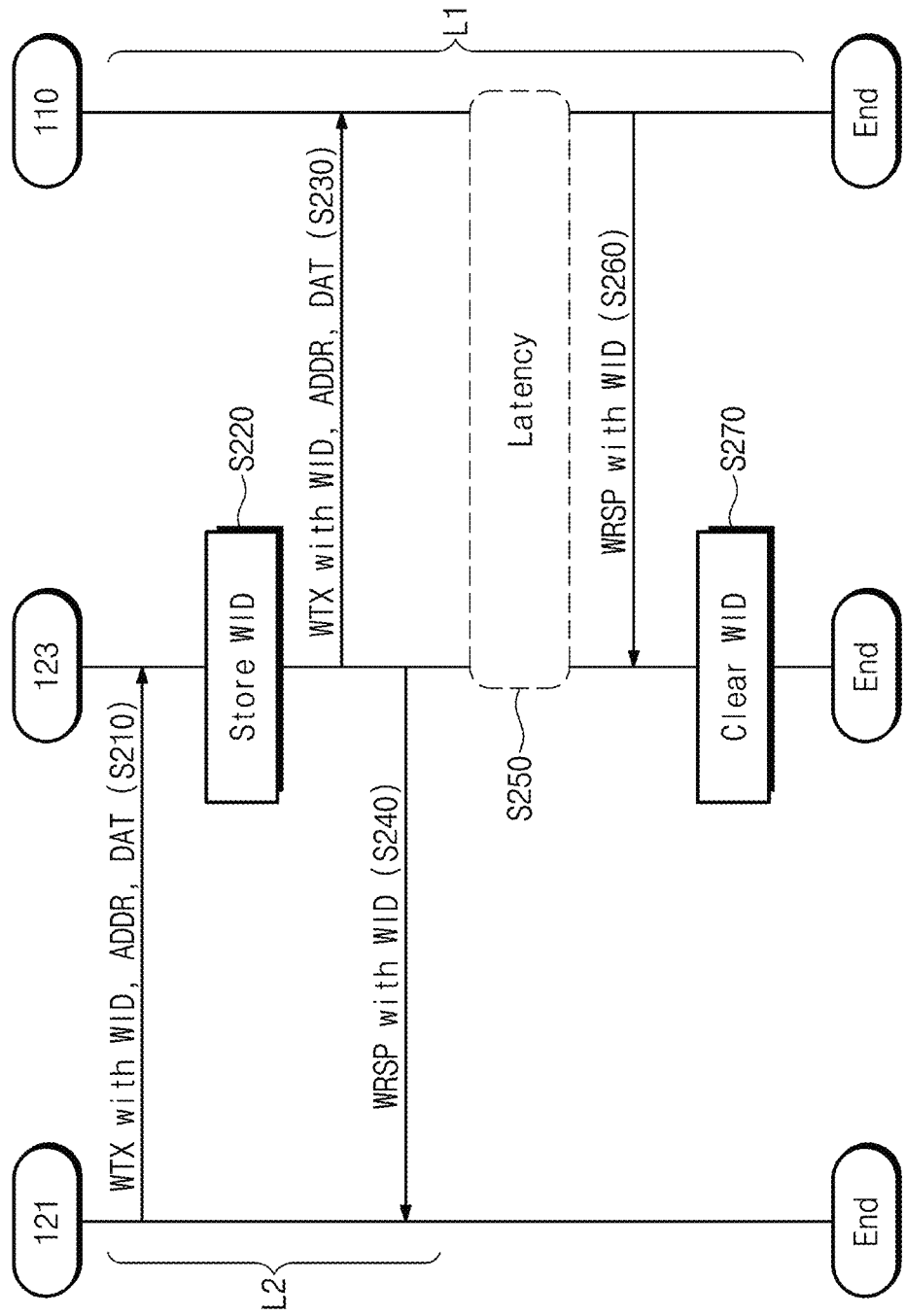
FIG. 3 illustrates an example in which a transaction accelerator performs a write transaction operation according to at least one example embodiment.

FIG. 3 illustrates an example in which the transaction accelerator 123 performs at least one write transaction operation according to at least one example embodiment. While FIG. 3 illustrates a write transaction operation, the example embodiments are not limited thereto, and for example, may be a read transaction operation, an erase operation, etc. Referring to FIGS. 1 and 3, in operation S210, the processor 121 may transmit at least one write transaction request WTX to the transaction accelerator 123, but is not limited thereto. The write transaction request WTX may be transmitted together with a write identifier WID, a target address ADDR (e.g., a destination address, a destination component address, etc.), and/or write data DAT, etc., but is not limited thereto, and for example, the write transaction request WTX may have additional fields, etc.

In operation S220, the transaction accelerator 123 may store the write identifier WID of the write transaction request WTX in memory, such as an internal buffer of the transaction accelerator 123, the SRAM 122, etc., but the example embodiments are not limited thereto. In operation S230, the transaction accelerator 123 may transmit the write transaction request WTX to the main bus 110 together with the write identifier WID, the target address ADDR, and/or the write data DAT, etc.

In operation S240, the transaction accelerator 123 may transmit a write transaction response WRSP including the write identifier WID, etc., to the processor 121. The write transaction response WRSP may notify the processor 121 that a write transaction operation associated with the write identifier WID has been completed and/or any other status message corresponding to the write transaction operation. In response to a transaction operation status indicating the write transaction response WRSP has been received, the processor 121 may identify the completion of the write transaction operation.

Operation S250 may correspond to a latency (e.g., latency time) associated with and/or corresponding to the performance of the write transaction operation. For example, the latency in operation S250 may include a first time taken for the write transaction request WTX, which the transaction accelerator 123 transmits to the main bus 110, to arrive at a component corresponding to the target address ADDR, a second time taken for the write data DAT to be written to the component corresponding to the target address ADDR, and a third time taken the write transaction response WRSP generated from the component corresponding to the target address ADDR to arrive at the main bus 110, etc., but is not limited thereto.

In operation S260, the main bus 110 may transmit the write transaction response WRSP to the transaction accelerator 123. The write transaction response WRSP may be transmitted together with the write identifier WID, etc. In response to receiving the write transaction response WRSP including the write identifier WID, the transaction accelerator 123 may compare the write identifier WID stored in operation S220 and the write identifier WID received in operation S260.

In response to the stored write identifier WID and the received write identifier WID being the same, the transaction accelerator 123 may identify the completion of the write transaction operation of the write transaction request WTX transmitted in operation S230. Afterwards, in operation S270, the transaction accelerator 123 may clear (e.g., delete and/or remove, etc.) the write identifier WID stored in memory in operation S220. In other words, the transaction accelerator 123 may terminate the write transaction request by clearing the write identifier WID, etc.

A time corresponding to a first latency L1 (e.g., a transaction operation latency) may be taken and/or may elapse until the write transaction response WRSP is received from the component corresponding to the target address ADDR in response to the write transaction request WTX. The transaction accelerator 123 may transmit the write transaction response WRSP to the processor 121 in response to receiving the write transaction request WTX from the processor 121. Accordingly, the latency (e.g., the transaction operation latency) that the processor 121 experiences may decrease from the first latency L1 to a second latency L2. That is, a write transaction of the processor 121 may be accelerated by the transaction accelerator 123.

Figure 4:
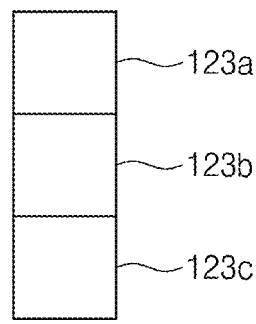
FIG. 4 illustrates an example of slots included in a transaction accelerator according to at least one example embodiment.

FIG. 4 illustrates an example of a plurality of slots, e.g., slots 123a, 123b, and 123c included in the transaction accelerator 123 according to at least one example embodiment, but the example embodiments are not limited thereto and there may be a greater or lesser number of slots included in the transaction accelerator 123. In at least one example embodiment, the first to third slots 123a to 123c may be implemented with various memory elements included in the transaction accelerator 123, the processor 121, and/or the CPU 120, such as first-in first-out (FIFO) or last-in first-out (LIFO) buffers, etc., stacks, and/or registers, etc., but the example embodiments are not limited thereto.

The transaction accelerator 123 may manage transaction requests based on data and/or values stored in the first to third slots 123a to 123c. For example, the transaction accelerator 123 may manage one transaction operation corresponding to one transaction request at each slot, but is not limited thereto.

Figure 5:
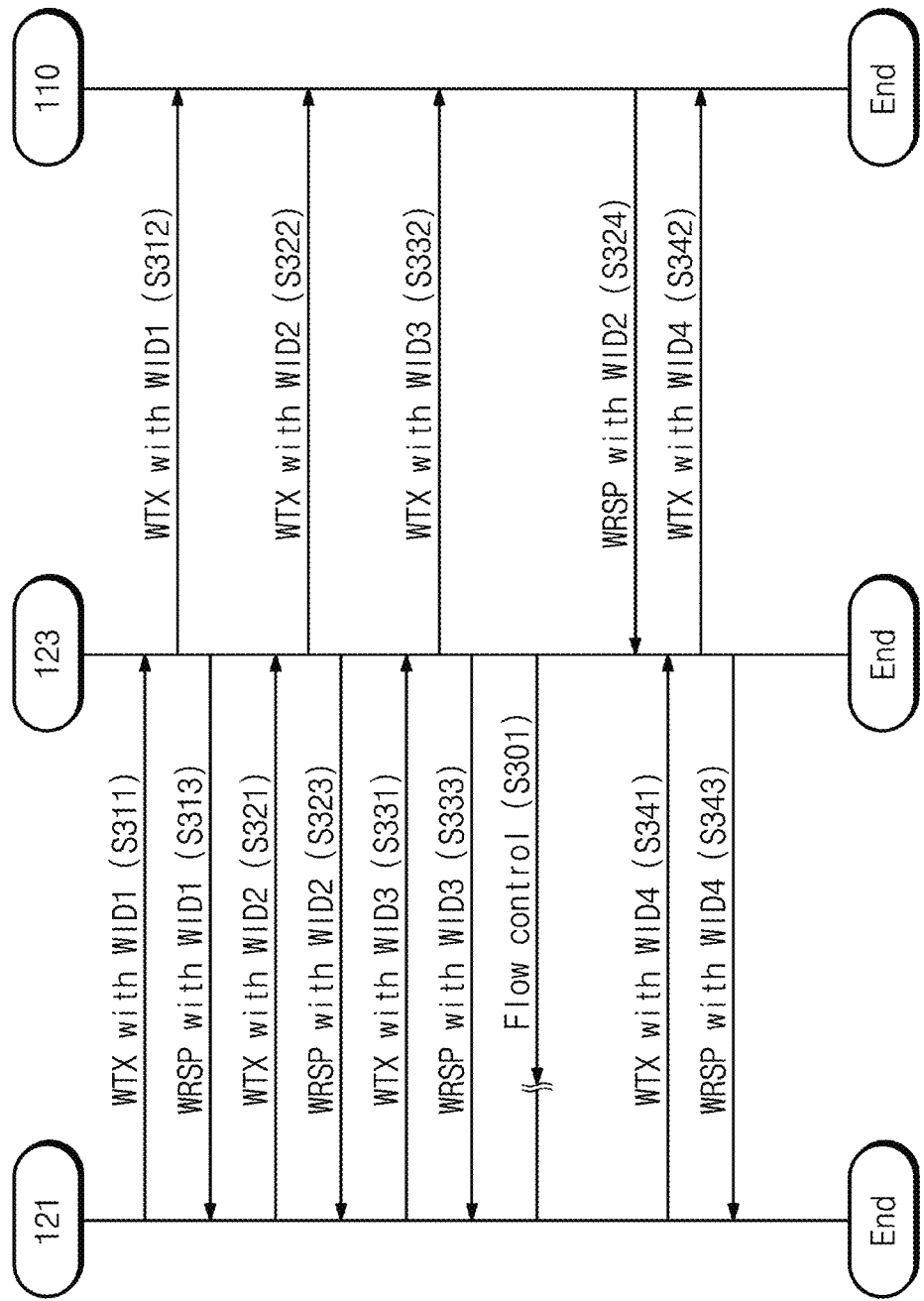
FIG. 5 illustrates an example in which a transaction accelerator increases the number of parallel transaction operations based on first to third slots of FIG. 4 according to at least one example embodiment.

FIG. 5 illustrates an example in which the transaction accelerator 123 increases the number of parallel transaction operations based on the first to third slots 123a to 123c of FIG. 4 according to some example embodiments. To reduce and/or prevent a drawing from being unnecessarily complicated, all redundant operations previously illustrated in FIG. 3 associated with each transaction operation which may be applicable to FIG. 5 have been omitted. Upon describing each transaction operation, a part of the operations of FIG. 3 may be referred to and/or cited if applicable.

Figure 6:
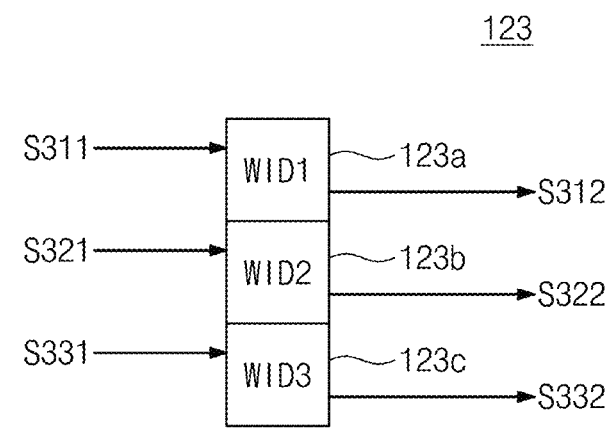
FIGS. 6 and 7 illustrate an example in which first to third slots are updated by a part of operations of FIG. 5 according to some example embodiments.
Figure 7:
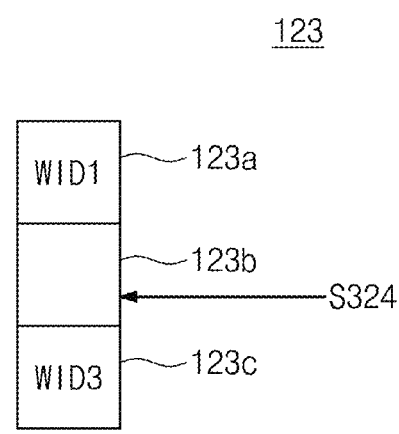

FIGS. 6 and 7 illustrate an example in which the first to third slots 123a to 123c are updated by a part of operations of FIG. 5 according to some example embodiments. Referring to FIGS. 1, 3, 5, and 6, in operation S311, the processor 121 may transmit the write transaction request WTX having a first write identifier WID1 to the transaction accelerator 123, however the example embodiments are not limited thereto, and other types of transaction operations may be requested. As described with reference to FIG. 3, the write transaction request WTX may be transmitted together with the target address ADDR and/or the write data DAT, etc., but the target address ADDR and the write data DAT have been omitted from FIG. 5 for the sake of clarity and brevity.

In response to operation S311, the transaction accelerator 123 may store the first write identifier WID1 in a slot, such as the first slot 123a, but is not limited thereto. In operation S312, the transaction accelerator 123 may transmit the write transaction request WTX having the first write identifier WID1, etc., to the main bus 110. In operation S313, the transaction accelerator 123 may transmit the write transaction response WRSP having the first write identifier WID1 to the processor 121.

Because at least one empty slot is present in the slots associated with the processor 121, e.g., first to third slots 123a to 123c, in operation S321, the processor 121 may transmit the write transaction request WTX having a second write identifier WID2 to the transaction accelerator 123, but is not limited thereto. In other words, the processor 121 may determine whether an empty slot is available in the plurality of transaction operation slots associated with the processor 121, etc., and may then transmit a transaction request including a transaction identifier based on the results of the determination, etc. In response to operation S321, the transaction accelerator 123 may store the second write identifier WID2 in, e.g., the second slot 123b, a next slot, an empty slot, etc. In operation S322, the transaction accelerator 123 may transmit the write transaction request WTX having the second write identifier WID2 to the main bus 110, etc. In operation S323, the transaction accelerator 123 may transmit the write transaction response WRSP having the second write identifier WID2 to the processor 121.

Because at least one empty slot is present in the slots associated with the processor 121, e.g., first to third slots 123a to 123c, in operation S331, the processor 121 may transmit the write transaction request WTX having a third write identifier WID3 to the transaction accelerator 123, etc. In other words, the processor 121 may determine whether an empty slot is available in the plurality of transaction operation slots associated with the processor 121, etc., and may then transmit a transaction request including a transaction identifier based on the results of the determination, etc. In response to operation S331, the transaction accelerator 123 may store the third write identifier WID3 in, e.g., the third slot 123c, a next slot, an empty slot, etc., but is not limited thereto. In operation S332, the transaction accelerator 123 may transmit the write transaction request WTX having the third write identifier WID3 to the main bus 110. In operation S333, the transaction accelerator 123 may transmit the write transaction response WRSP having the third write identifier WID3 to the processor 121.

In at least one example embodiment, the transaction accelerator 123 may sequentially store write identifiers (e.g., transaction identifiers, etc.) in the plurality of transaction slots, e.g., first to third slots 123a to 123c, etc., in a FIFO manner, but the example embodiments are not limited thereto, and other methods may be used. Because an empty slot is absent from the plurality of transaction slots, e.g., first to third slots 123a to 123c, etc., and/or because all of the transaction slots, e.g., first to third slots 123a to 123c, etc., are full, in operation S301, the transaction accelerator 123 may perform a flow control (e.g., a flow control operation, etc.). In other words, the transaction accelerator 123 determine whether there are any free transaction slots available, and based on the results of the determination, the transaction accelerator 123 may prohibit and/or prevent the processor 121 from additionally transmitting a transaction request by disabling a ready signal, but the example embodiments are not limited thereto.

Referring to FIGS. 1, 3, 5, and 7, in operation S324, the main bus 110 may transmit the write transaction response WRSP (e.g., transaction response, etc.) having the second write identifier WID2 to the transaction accelerator 123. In at least one example embodiment, because the latencies of the main bus 110 and components connected with the main bus 110 are different, the ordering of write transaction responses and/or other transaction responses received from the main bus 110 may be different from the ordering of the write transaction requests and/or other transaction requests transmitted to the main bus 110, and this out-of-orderness may be allowed.

In response to operation S324, the transaction accelerator 123 may clear the second slot 123b, but is not limited thereto. As the second slot 123b is cleared and/or the transaction accelerator 123 determines that a free transaction slot is available, etc., the transaction accelerator 123 may terminate the flow control (e.g., flow control operation) by enabling the ready signal and/or otherwise signaling to the processor 121 that additional transaction requests may be transmitted.

Because an empty slot is present in the plurality of transaction slots, e.g., first to third slots 123a to 123c, etc., in operation S341, the processor 121 may transmit the write transaction request WTX having a fourth write identifier WID4 to the transaction accelerator 123. In response to operation S341, the transaction accelerator 123 may store the fourth write identifier WID4 in the free slot, e.g., second slot 123b. In operation S342, the transaction accelerator 123 may transmit the write transaction request WTX having the fourth write identifier WID4 to the main bus 110, etc. In operation S343, the transaction accelerator 123 may transmit the write transaction response WRSP having the fourth write identifier WID4 to the processor 121.

As described above, when the transaction accelerator 123 includes three slots, the number of parallel transaction operations of the CPU 120 may be regarded as increasing from "1" to "3," but the example embodiments are not limited thereto, and the transaction accelerator 123 may include a greater or lesser number of slots, etc. The transaction accelerator 123 may be determined based on the number of parallel transaction operations that the processor 121 supports and the number of parallel transaction operations that the main bus 110 supports.

Figure 8:
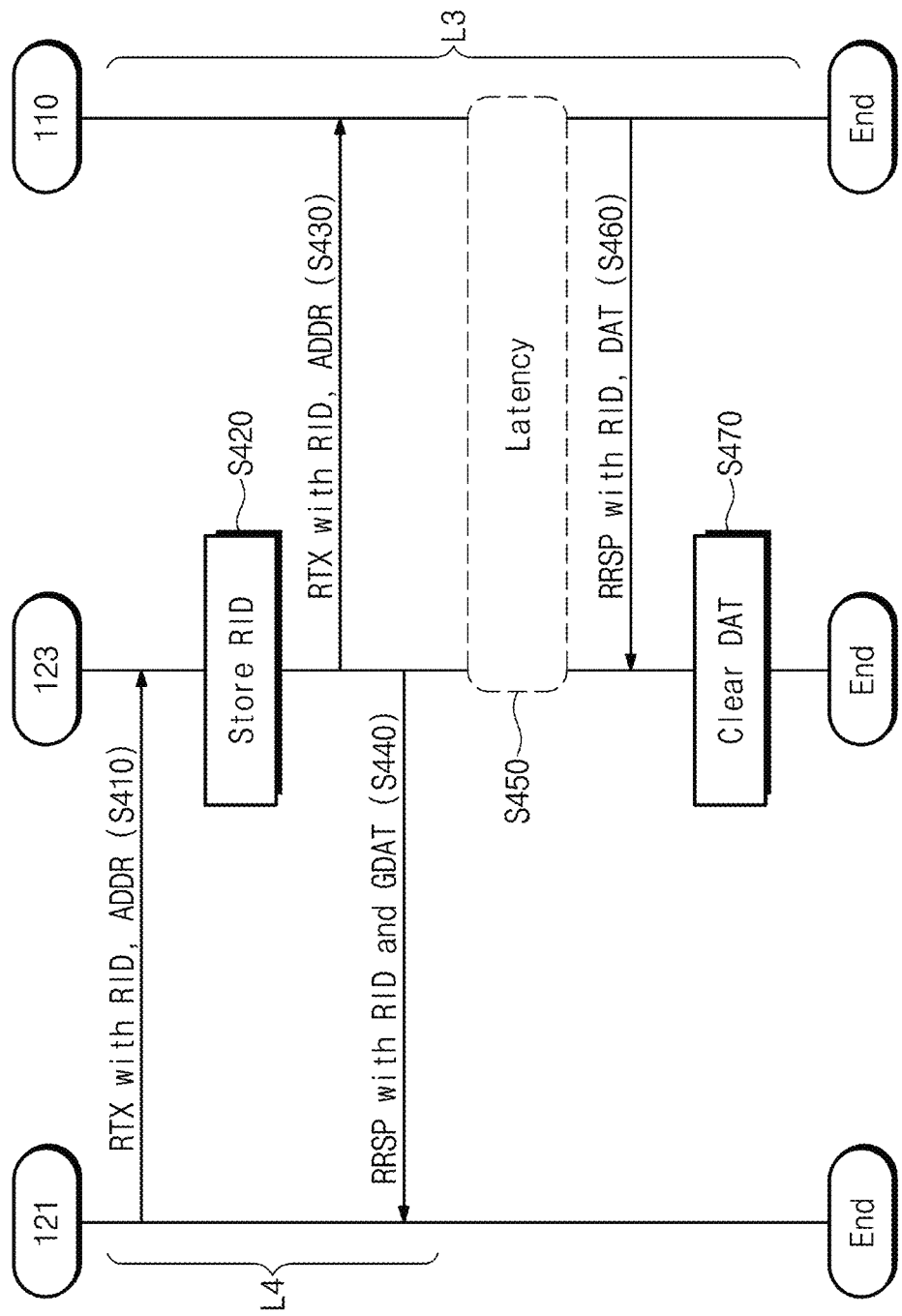
FIG. 8 illustrates an example in which a transaction accelerator performs a read transaction operation according to at least one example embodiment.

FIG. 8 illustrates an example in which the transaction accelerator 123 performs a read transaction operation according to at least one example embodiment. Referring to FIGS. 1 and 8, in operation S410, the processor 121 may transmit a read transaction request RTX to the transaction accelerator 123, but the example embodiments are not limited thereto. The read transaction request RTX may be transmitted together with a read identifier RID and/or a target address ADDR, etc., but is not limited thereto and may include other types of information.

In operation S420, the transaction accelerator 123 may store the read identifier RID of the read transaction request RTX in memory, such as an internal memory of the transaction accelerator 123, the SRAM 122, etc. In operation S430, the transaction accelerator 123 may transmit the read transaction request RTX to the main bus 110 together with the read identifier RID, and/or the target address ADDR, etc.

In operation S440, the transaction accelerator 123 may transmit a read transaction response RRSP including the read identifier RID, etc., to the processor 121. The read transaction response RRSP may notify the processor 121 of a status of the transaction request, e.g., that a read transaction operation associated with the read identifier RID has been completed, etc. The read transaction response RRSP may be transmitted together with garbage data GDAT, but the example embodiments are not limited thereto. The garbage data GDAT may be any data, not actually read data, and may be called various names such as dummy data and/or noise data, etc.

According to at least one example embodiment, the processor 121 may, in advance, recognize that the read transaction response RRSP includes the garbage data GDAT. Accordingly, the processor 121 may ignore the garbage data GDAT. In response to the received read transaction response RRSP, the processor 121 may identify the completion of the read transaction operation, etc.

Operation S450 may correspond to a latency (e.g., a read transaction latency, etc.). For example, the latency in operation S450 may include a fourth time taken for the read transaction request RTX, which the transaction accelerator 123 transmits to the main bus 110, to arrive at a component corresponding to the target address ADDR, a fifth time taken for the read data DAT to be read from the component corresponding to the target address ADDR, and a sixth time taken the read transaction response RRSP generated from the component corresponding to the target address ADDR to arrive at the main bus 110, but is not limited thereto.

In operation S460, the main bus 110 may transmit the read transaction response RRSP to the transaction accelerator 123. The read transaction response RRSP may be transmitted together with the read identifier RID and/or the read data DAT, but is not limited thereto. When the read transaction response RRSP including the read identifier RID is received, the transaction accelerator 123 may compare the read identifier RID stored in operation S420 with the read identifier RID received in operation S460.

In response to determining that the stored read identifier RID and the received read identifier RID are the same, the transaction accelerator 123 may identify the completion of the read transaction operation of the read transaction request RTX transmitted in operation S430. Afterwards, in operation S470, the transaction accelerator 123 may clear (e.g., delete and/or remove, etc.) the read identifier RID stored in operation S420. The transaction accelerator 123 may terminate the read transaction request RTX by clearing the read identifier RID.

A time corresponding to a third latency L3 may be taken until the read transaction response RRSP is received from the component corresponding to the target address ADDR in response to the read transaction request RTX. The transaction accelerator 123 may transmit the read transaction response RRSP to the processor 121 in response to receiving the read transaction request RTX from the processor 121. Accordingly, a latency that the processor 121 experiences may decrease from the third latency L3 to a fourth latency L4. That is, a read transaction of the processor 121 may be accelerated by the transaction accelerator 123.

Figure 9:
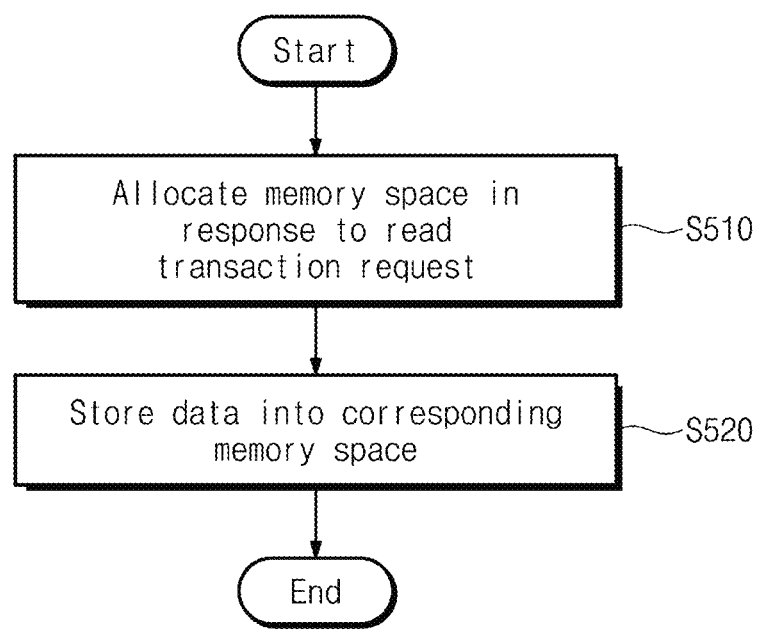
FIG. 9 illustrates an example of a method in which a transaction accelerator manages read data according to at least one example embodiment.

In comparison to the write transaction operation of FIG. 3, the read transaction operation of FIG. 8 manages the read data DAT received from the main bus 110. FIG. 9 illustrates an example in which the transaction accelerator 123 manages the read data DAT.

Referring to FIGS. 1, 8, and 9, in operation S510, the transaction accelerator 123 may allocate a memory space (and/or a storage space) in response to a received read transaction request. In at least one example embodiment, the allocation of the memory space may be performed in response to operation S410. The transaction accelerator 123 may allocate memory spaces in the SRAM 122 of the processor 121, etc., but the example embodiments are not limited thereto.

In operation S520, the transaction accelerator 123 may store the read data DAT received from the main bus 110 in a corresponding memory space, e.g., a memory space located in the SRAM 122, etc. Operation S520 may be performed in response to operation S460, but is not limited thereto. The transaction accelerator 123 may store the read data DAT included in the read transaction response RRSP in the memory space allocated in operation S10.

Figure 10:
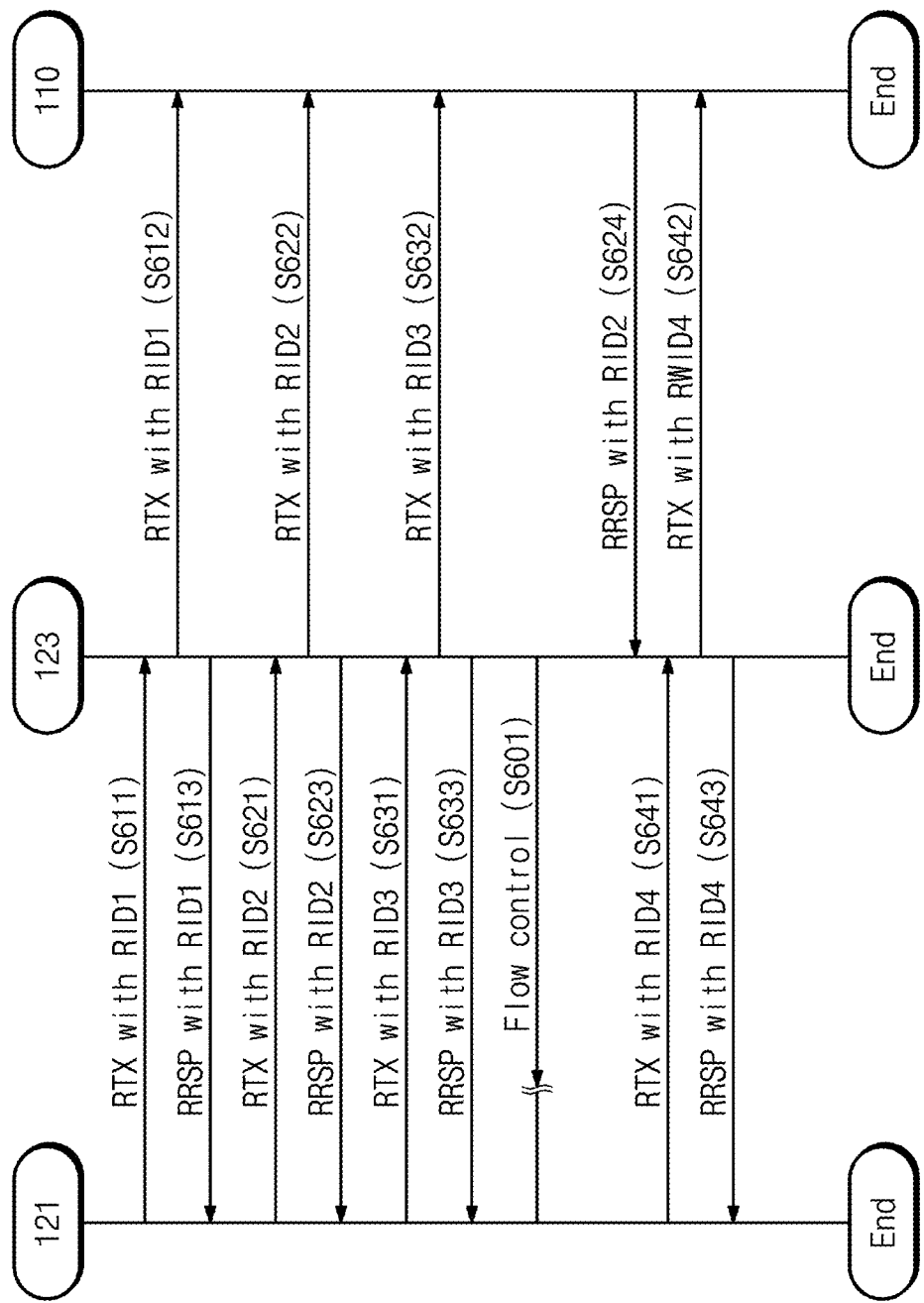
FIG. 10 illustrates an example in which a transaction accelerator increases the number of parallel transaction operations based on first to third slots of FIG. 4 according to at least one example embodiment.

FIG. 10 illustrates an example in which the transaction accelerator 123 increases the number of parallel transaction operations based on a plurality of transaction slots, e.g., the first to third slots 123a to 123c, etc., of FIG. 4, but the example embodiments are not limited thereto. For the sake of clarity and/or brevity, all of the operations illustrated in FIG. 8 associated with each transaction operation are not illustrated in FIG. 10 (and/or duplicative operations are not illustrated in FIG. 10). Upon describing each transaction operation, a part of the operations of FIG. 8 may be cited if necessary.

Figure 11:
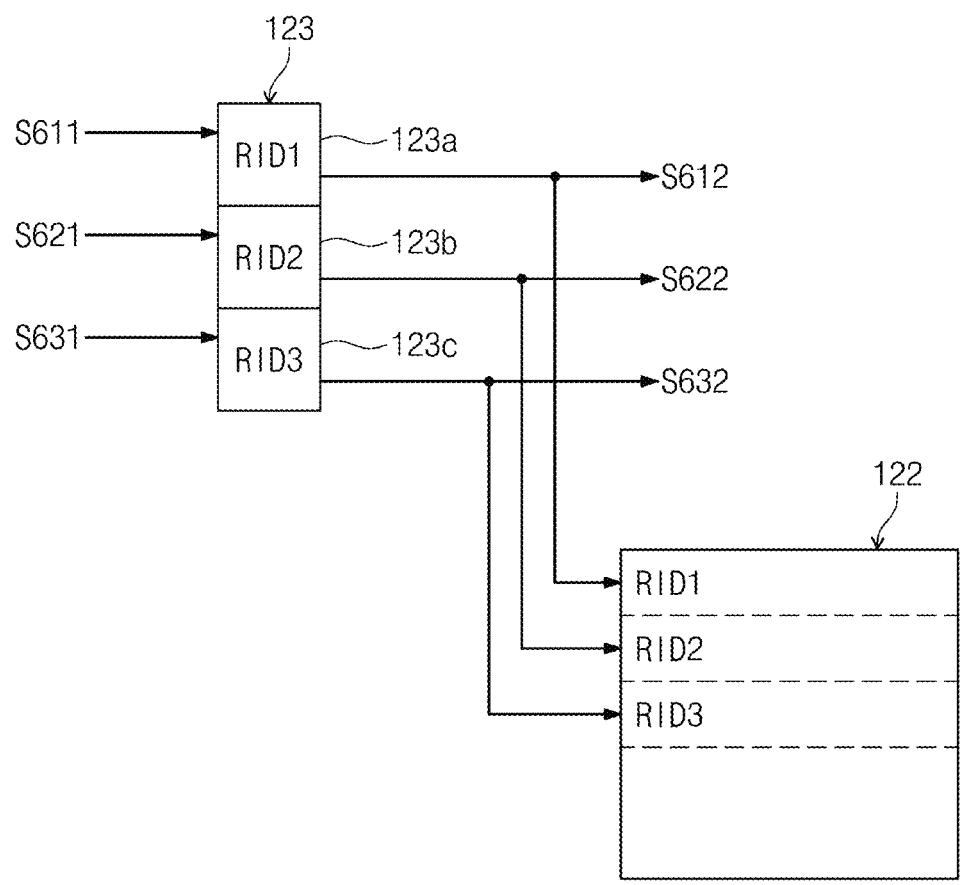
FIGS. 11 to 13 illustrate an example in which first to third slots are updated by a part of operations of FIG. 10 according to some example embodiments.
Figure 12:
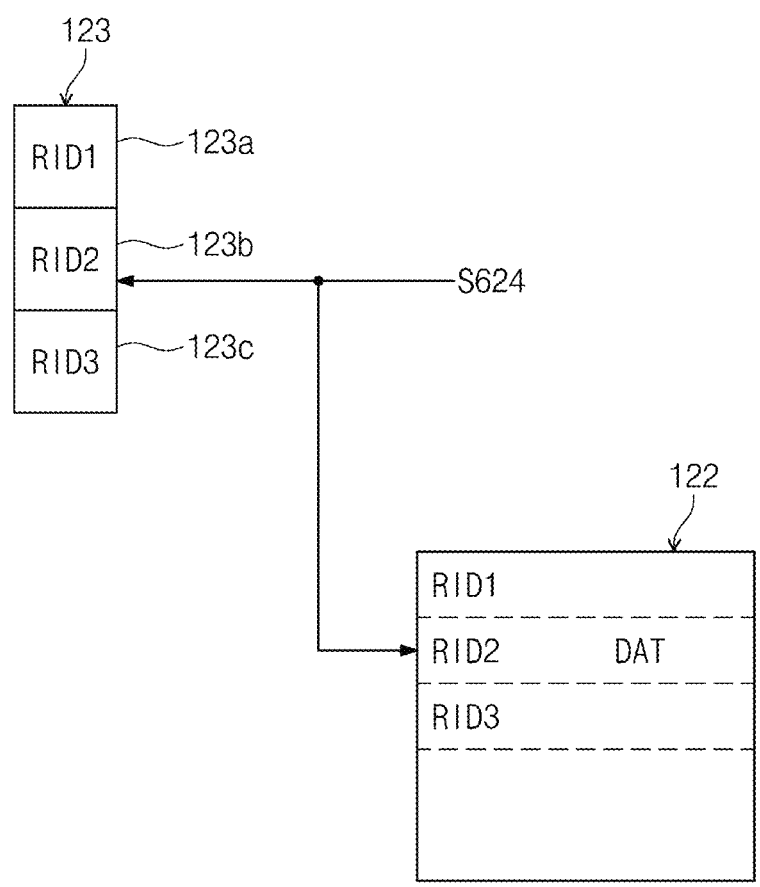
Figure 13:
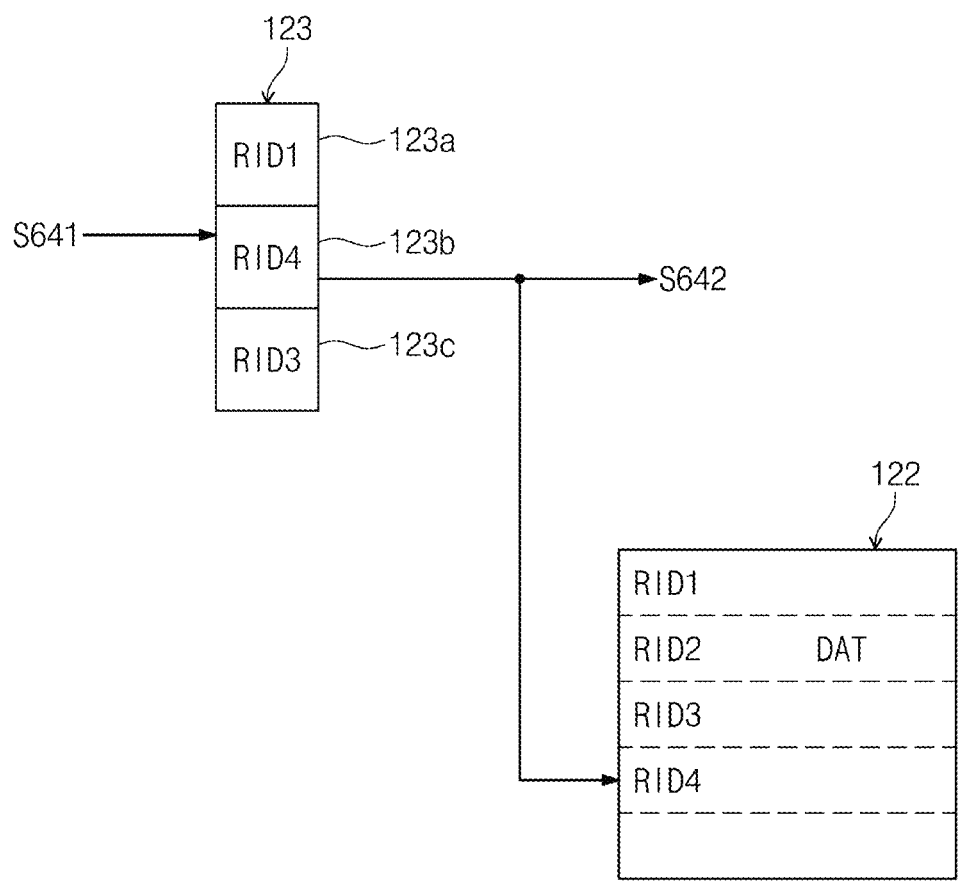

FIGS. 11 to 13 illustrate an example in which a plurality of transaction slots, e.g., the first to third slots 123a to 123c, etc., are updated by a part of operations of FIG. 10, but the example embodiments are not limited thereto. Referring to FIGS. 1, 8, 10, and 11, in operation S611, the processor 121 may transmit the read transaction request RTX having a first read identifier RID1 to the transaction accelerator 123. As described with reference to FIG. 3, the read transaction request RTX may be transmitted together with the target address ADDR, but the target address ADDR is omitted from FIG. 10 for the sake of clarity.

In response to operation S611, the transaction accelerator 123 may store the first read identifier RID1 in a free slot, such as the first slot 123a, but is not limited thereto. In operation S612, the transaction accelerator 123 may transmit the read transaction request RTX having the first read identifier RID1 to the main bus 110. The transaction accelerator 123 may allocate a storage space corresponding to the first read identifier RID1 in the SRAM 122, etc. In operation S613, the transaction accelerator 123 may transmit the read transaction response RRSP having the first read identifier RID1 to the processor 121.

Because an empty slot is present in the first to third slots 123a to 123c, in operation S621, the processor 121 may transmit the read transaction request RTX having a second read identifier RID2 to the transaction accelerator 123. In other words, the processor 121 may determine whether an empty slot is available in the plurality of transaction slots associated with the transaction accelerator 123 and/or the processor 121, and based on the results of the determination, may transmit a new and/or next read transaction request to the transaction accelerator 123, etc. In response to operation S621, the transaction accelerator 123 may store the second read identifier RID2 in the next free slot, e.g., the second slot 123b. In operation S622, the transaction accelerator 123 may transmit the read transaction request RTX having the second read identifier RID2 to the main bus 110. The transaction accelerator 123 may allocate a storage space corresponding to the second read identifier RID2 in the SRAM 122. In operation S623, the transaction accelerator 123 may transmit the read transaction response RRSP having the second read identifier RID2 to the processor 121.

Because an empty slot is present in the first to third slots 123a to 123c, in operation S631, the processor 121 may transmit the read transaction request RTX having a third read identifier RID3 to the transaction accelerator 123. In other words, the processor 121 may determine whether an empty slot is available in the plurality of transaction slots associated with the transaction accelerator 123 and/or the processor 121, and based on the results of the determination, may transmit a new and/or next read transaction request to the transaction accelerator 123, etc. In response to operation S631, the transaction accelerator 123 may store the third read identifier RID3 in the third slot 123c, but is not limited thereto. In operation S632, the transaction accelerator 123 may transmit the read transaction request RTX having the third read identifier RID3 to the main bus 110. The transaction accelerator 123 may allocate a storage space corresponding to the third read identifier RID3 in the SRAM 122. In operation S633, the transaction accelerator 123 may transmit the read transaction response RRSP having the third read identifier RID3 to the processor 121.

In at least one example embodiment, the transaction accelerator 123 may sequentially store read identifiers in the first to third slots 123a to 123c in a FIFO manner, but the example embodiments are not limited thereto. The transaction accelerator 123 may sequentially allocate storage spaces in the SRAM 122 in the same order as an order in which read transactions are received, but the example embodiments are not limited thereto. Sizes of the storage spaces allocated in the SRAM 122 may be the same, but are not limited thereto. For example, a size of each storage space allocated in the SRAM 122 may correspond to a size of data (e.g., a size of the largest data) that the CPU 120 is capable of communicating through a single transaction (e.g., except for successive transactions such as a burst), etc. For example, when a single transaction is performed in units of a word or a half-word, a size of each of allocated storage spaces may correspond to a word, etc.

Because an empty slot is absent from the plurality of slots, e.g., first to third slots 123a to 123c, etc., and/or because all of the slots, e.g., first to third slots 123a to 123c are full, in operation S601, the transaction accelerator 123 may perform a flow control (e.g., a flow control operation). In other words, the transaction accelerator 123 may determine whether a free slot is available, and based on the results of the determination, may perform a flow control operation, etc. For example, the transaction accelerator 123 may disable, prohibit, and/or prevent the processor 121 from additionally transmitting a transaction request by disabling a ready signal, but the example embodiments are not limited thereto.

Referring to FIGS. 1, 8, 10, and 12, in operation S624, the main bus 110 may transmit the read transaction response RRSP having the second read identifier RID2, etc., to the transaction accelerator 123. As described with reference to FIG. 8, the read transaction response RRSP may include the read data DAT, but is not limited thereto. The transaction accelerator 123 may store the read data DAT in a storage space corresponding to the second read identifier RID2.

In at least one example embodiment, because latencies of the main bus 110 and components connected to the main bus 110 are different, the ordering of the read transaction responses received from the main bus 110 may be different from the ordering of the read transaction requests transmitted to the main bus 110, and this out-of-orderness may be allowed.

In response to operation S624, the transaction accelerator 123 may clear the second slot 123b, but the example embodiments are not limited thereto. As the second slot 123b is cleared, the transaction accelerator 123 may terminate the flow control (e.g., the flow control operation) by enabling the ready signal.

Referring to FIGS. 1, 8, 10, and 13, because an empty slot is present in the first to third slots 123a to 123c, and/or based on the enabled ready signal, in operation S641, the processor 121 may transmit the read transaction request RTX having a fourth read identifier RID4 to the transaction accelerator 123. In response to operation S641, the transaction accelerator 123 may store the fourth read identifier RID4 in an empty transaction slot, e.g., the second slot 123b. The transaction accelerator 123 may allocate a storage space corresponding to the fourth read identifier RID4 in the SRAM 122, but is not limited thereto. In operation S642, the transaction accelerator 123 may transmit the read transaction request RTX having the fourth read identifier RID4 to the main bus 110. In operation S643, the transaction accelerator 123 may transmit the read transaction response RRSP having the fourth read identifier RID4 to the processor 121.

As described above, when the transaction accelerator 123 includes three slots, the number of parallel transaction operations of the CPU 120 may be regarded as increasing from "1" to "3," but the example embodiments are not limited thereto, and there may be a greater or lesser number of transaction slots. The transaction accelerator 123 may be determined based on the number of parallel transaction operations that the processor 121 supports and the number of parallel transaction operations that the main bus 110 supports.

In at least one example embodiment, the transaction accelerator 123 may separately include write slots for managing write transaction operations and read slots for managing read transaction operations, and may independently use the write slots and the read slots, etc., but the example embodiments are not limited thereto. For another example, the transaction accelerator 123 may include common slots for managing transaction operations (e.g., many any type of transaction operations) and may use the common slots in common to manage write transaction operations and read transaction operations, etc.

Figure 14:
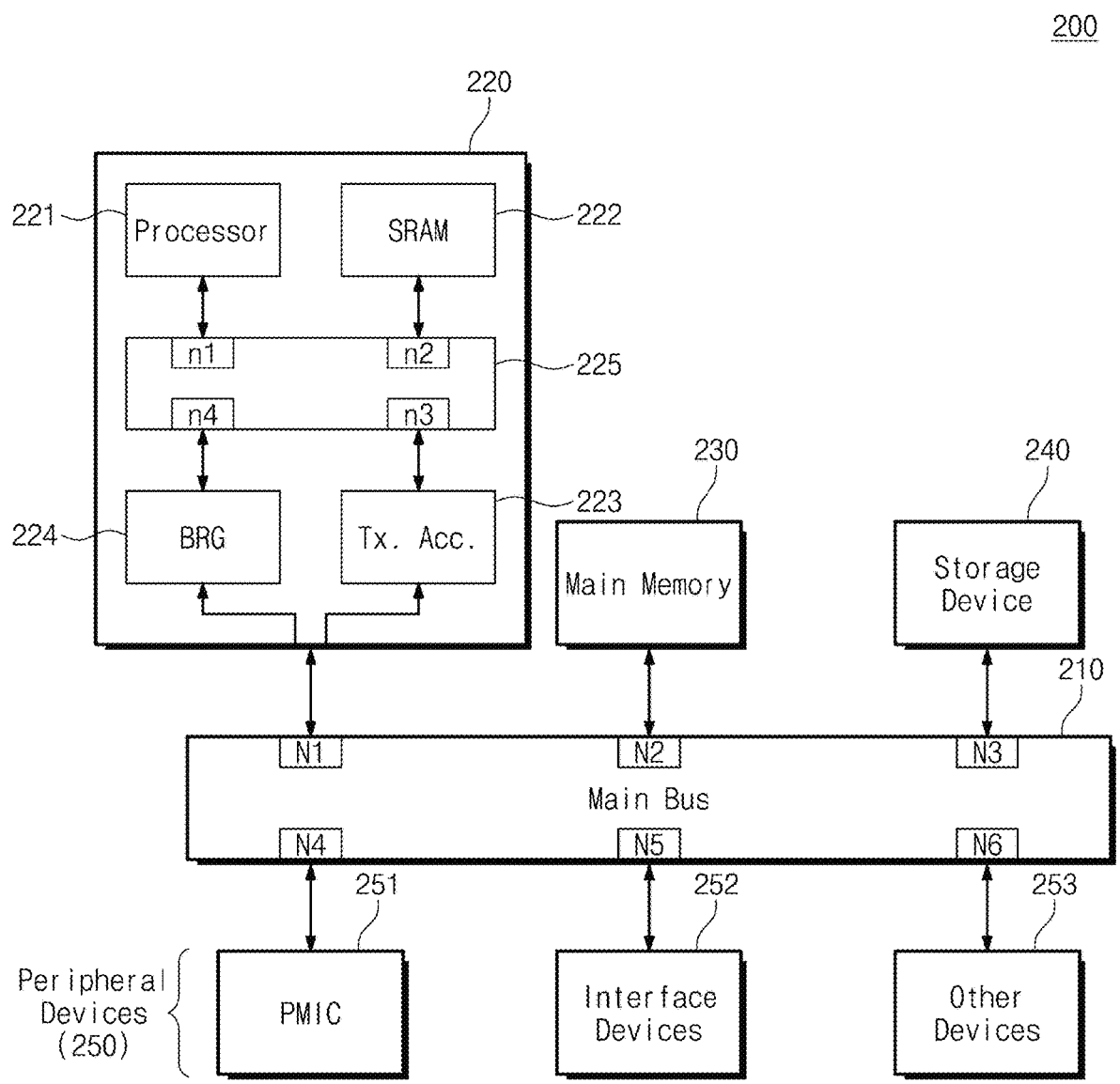
FIG. 14 illustrates a computing device according to at least one example embodiment of the inventive concepts.

FIG. 14 illustrates a computing device 200 according to at least one example embodiment of the inventive concepts. Referring to FIG. 14, the computing device 200 may include a main bus 210, a central processing unit 220, a main memory 230, a storage device 240, and/or a plurality of peripheral devices 250, etc. The plurality of peripheral devices 250 may include, for example, a PMIC 251, one or more interface devices 252, and/or other devices 253, etc., but is not limited thereto.

Configurations and operations of the main bus 210, the main memory 230, the storage device 240, and the peripheral devices 250 may be the same as those of the main bus 110, the main memory 130, the storage device 140, and the peripheral devices 150 described with reference to FIG. 1, but the example embodiments are not limited thereto. Thus, additional description will be omitted to avoid redundancy.

The central processing unit (CPU) 220 may be connected with the first node N1 of the main bus 210, but is not limited thereto. The CPU 220 may perform a transaction operation with the main bus 210 and/or with any other components of the computing device 200 through the main bus 210, etc., but is not limited thereto. The transaction operation may include transmitting, at the CPU 220, a transaction request to the main bus 210 and receiving, at the CPU 120, a transaction response corresponding to the transaction request from the main bus 210. The transaction operation may include a read transaction operation and/or a write transaction operation, etc.

The CPU 220 may include at least one processor 221, an SRAM 222, a transaction accelerator 223 (marked as Tx. ACC. in FIG. 14), a bridge 224 (marked as BRG in FIG. 14), and/or an internal bus 225, etc. The internal bus 225 may provide at least one channel between internal components of the CPU 220. The internal bus 225 may include, for example, first to fourth internal nodes n1 to n4, etc., configured to be coupled with the components of the CPU 220 and may provide channels between the first to fourth internal nodes n1 to n4, but the example embodiments are not limited thereto, and there may be a greater or lesser number of channels and/or nodes, etc.

The processor 221 may be connected with the first internal node n1 of the internal bus 225. A configuration and an operation of the processor 221 may be the same as those of the processor 121 of FIG. 1 except that the SRAM 222 is located outside the processor 221, but the example embodiments are not limited thereto. The SRAM 222 may be connected with the second internal node n2 of the internal bus 225, but is not limited thereto. A configuration and an operation of the SRAM 222 may be the same as those of the SRAM 122 of FIG. 1 except that the SRAM 222 is located outside the processor 221 and is connected with the internal bus 225, but the example embodiments are not limited thereto.

The transaction accelerator 223 may be connected with the third internal node n3 of the internal bus 225, but is not limited thereto. A configuration and an operation of the transaction accelerator 223 may be the same as those of the transaction accelerator 123 of FIG. 1 except that the transaction accelerator 223 is connected with the third internal node n3 of the internal bus 225, but the example embodiments are not limited thereto. The bridge 224 may be connected with the fourth internal node n4 of the internal bus 225, but is not limited thereto. A configuration and an operation of the bridge 224 may be the same as those of the bridge 124 of FIG. 1 except that the bridge 224 is connected with the fourth internal node n4 of the internal bus 225, but the example embodiments are not limited thereto. Unlike the description given with reference to FIG. 1, the host device of the transaction accelerator 223 may be the internal bus 225 or the processor 221, etc.

The internal bus 225 may transfer a transaction request received from the processor 221 to one of the transaction accelerator 223 and the bridge 224 depending on and/or based on a target address. The internal bus 225 may transfer a transaction response provided from the transaction accelerator 223 or the bridge 224 to the processor 221.

The SRAM 222 may store codes (e.g., computer readable instructions and/or program code) and/or data that are processed by the processor 121. A portion of a storage space of the SRAM 222 may be allocated by the transaction accelerator 223 so as to store read data in a read transaction operation.

The transaction accelerator 223 may receive one or more transaction requests from the processor 221 through the internal bus 225 and may transmit one or more transaction responses to the processor 221 through the internal bus 225. The transaction accelerator 223 may allocate a storage space of the SRAM 222 through the internal bus 225 and may store data in the SRAM 222. The transaction accelerator 223 may transmit data provided from the SRAM 222 through the internal bus 225 to the main bus 210 as write data.

The bridge 224 may communicate with the processor 221 and/or the SRAM 222 through the internal bus 225. The bridge 224 may communicate with the main bus 210.

Figure 15:
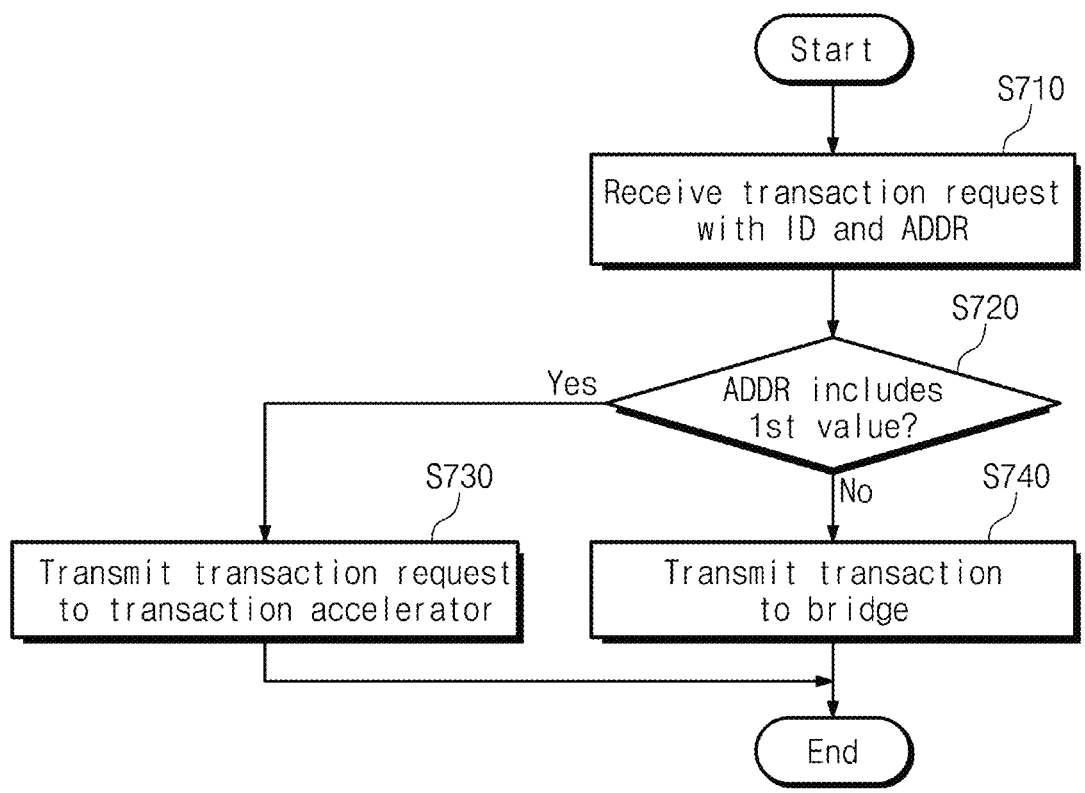
FIG. 15 illustrates an example of an operating method of an internal bus according to at least one example embodiment.

FIG. 15 illustrates an example of an operating method of the internal bus 225 according to at least one example embodiment. Referring to FIGS. 14 and 15, in operation S710, the internal bus 225 may receive a transaction request including an identifier ID and/or a target address ADDR, etc., from the processor 221, but is not limited thereto.

In operation S720, the internal bus 225 may determine whether the target address ADDR includes a first value (e.g., a desired value, a target value, etc.). For example, the internal bus 225 may determine whether bits of the target address ADDR including the most significant bit include the first value and/or desired value, but the example embodiments are not limited thereto.

When the target address ADDR includes the first value and/or desired value, in operation S730, the internal bus 225 may transfer the transaction request to the transaction accelerator 223. When the target address ADDR does not include the first value and/or desired value, in operation S740, the internal bus 225 may transfer the transaction request to the bridge 224.

That is, by including the first value for identifying the transaction accelerator 223 or the bridge 224 in the target address ADDR, the processor 221 may determine whether to transmit a transaction request through the transaction accelerator 223 or through the bridge 224, etc. Depending on whether the target address ADDR includes the first value and/or desired value, the internal bus 225 may selectively transfer the transaction request from the processor 221 to the transaction accelerator 223 or the bridge 224.

Figure 16:
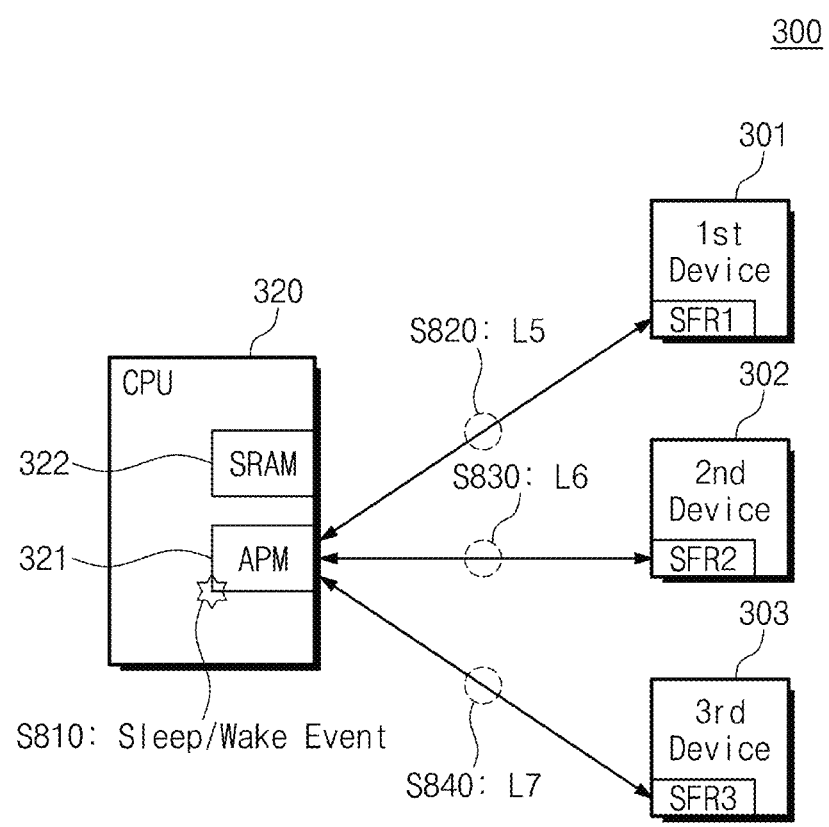
FIG. 16 illustrates an example in which a computing device according to at least one example embodiment of the inventive concepts operates.

FIG. 16 illustrates an example in which the computing device 300 according to at least one example embodiment of the inventive concepts operates. Referring to FIG. 16, the computing device 300 may include a CPU 320, a first device 301, a second device 302, and/or a third device 303, etc., but the example embodiments are not limited thereto.

The CPU 320 may correspond to the CPU 120 of FIG. 1 or the CPU 220 of FIG. 14, but the example embodiments are not limited thereto. The CPU 320 may include an active power management (APM) processor 321 and/or an SRAM 322, etc. The APM processor 321 may correspond to the processor 121 of FIG. 1 or the processor 221 of FIG. 14, but the example embodiments are not limited thereto. The SRAM 322 may correspond to the SRAM 122 of FIG. 1 or the SRAM 222 of FIG. 14, but the example embodiments are not limited thereto. The APM processor 321 may control the entering and/or the exiting of a power saving mode and/or a normal mode of the computing device 300, etc. In at least one example embodiment, the CPU 320 may not perform a transaction acceleration function, but is not limited thereto.

The first device 301 may include at least one first special function register SFR1, but is not limited thereto. The first device 301 may operate based on information stored in the first special function register SFR1. The second device 302 may include at least one second special function register SFR2, but is not limited thereto. The second device 302 may operate based on information stored in the second special function register SFR2. The third device 303 may include at least one third special function register SFR3, but is not limited thereto. The third device 303 may operate based on information stored in the third special function register SFR3, but is not limited thereto.

In at least one example embodiment, each of the first device 301, the second device 302, and the third device 303, etc., may be implemented with at least one of the main bus 110, the main memory 130, the storage device 140, and the peripheral devices 150 of the computing device 100 of FIG. 1, etc., but the example embodiments are not limited thereto. Additionally, each of the first device 301, the second device 302, and the third device 303, etc., may be implemented with at least one of the main bus 210, the main memory 230, the storage device 240, and the peripheral devices 250 of the computing device 200 of FIG. 14, etc., but the example embodiments are not limited thereto.

According to at least one example embodiment, the information stored in the first special function register SFR1 of the first device 301, the second special function register SFR2 of the second device 302, and/or the third special function register SFR3 of the third device 303, etc., may need to be maintained even in the power saving mode, but the example embodiments are not limited thereto. For example, the information stored in the first special function register SFR1, the second special function register SFR2, and/or the third special function register SFR3 may be information desired and/or necessary to quickly exit to the normal mode from the power saving mode, etc.

Meanwhile, in the power saving mode, a power to the first device 301, the second device 302, and/or the third device 303, etc., may be interrupted. To reduce and/or prevent the loss of the information (hereinafter referred to as "special function information") stored in the first special function register SFR1, the second special function register SFR2, and/or the third special function register SFR3, etc., the APM processor 321 may back up the special function information from the first special function register SFR1, the second special function register SFR2, and/or the third special function register SFR3, etc., when entering the power saving mode. When exiting the power saving mode, e.g., entering the normal mode, etc., the APM processor 321 may return the special function information to the first special function register SFR1, the second special function register SFR2, and/or the third special function register SFR3, etc.

In at least one example embodiment, the first device 301, the second device 302, and/or the third device 303, etc., may be distributed within the computing device 300 and may have distributed addresses. Accordingly, the APM processor 321 may directly access the first device 301, the second device 302, and/or the third device 303, etc., individually, rather than a way to use a means for supporting a successive access such as a direct memory access (DMA), etc.

In at least one example embodiment, in operation S810, a sleep event or a wake event may occur. The sleep event may be an event in which the computing device 300 enters the power saving mode from the normal mode. The wake event may be an event in which the computing device 300 enters the normal mode from the power saving mode.

In operation S820, the APM processor 321 may transmit at least one transaction request to the first device 301. In response to the sleep event, the APM processor 321 may transmit at least one read transaction request to the first device 301. In response to the wake event, the APM processor 321 may transmit at least one write transaction request to the first device 301. A delay time corresponding to a fifth latency L5 may be taken for the APM processor 321 to perform a transaction operation with the first special function register SFR1 of the first device 301, but the example embodiments are not limited thereto.

In operation S830, the APM processor 321 may transmit at least one transaction request to the second device 302. In response to the sleep event, the APM processor 321 may transmit the read transaction request to the second device 302. In response to the wake event, the APM processor 321 may transmit the write transaction request to the second device 302. A delay time corresponding to a sixth latency L6 may be taken for the APM processor 321 to perform a transaction operation with the second special function register SFR2 of the second device 302, but the example embodiments are not limited thereto.

In operation S840, the APM processor 321 may transmit at least one transaction request to the third device 303. In response to the sleep event, the APM processor 321 may transmit the read transaction request to the third device 303. In response to the wake event, the APM processor 321 may transmit the write transaction request to the third device 303. A delay time corresponding to a seventh latency L7 may be taken for the APM processor 321 to perform a transaction operation with the third special function register SFR3 of the third device 303, but the example embodiments are not limited thereto.

As described above, when the sleep event occurs, a latency may be desired and/or required which corresponds to a sum of the fifth to seventh latencies L5 to L7 necessary for the APM processor 321 to back up information stored in the first to third special function registers SFR1 to SFR3 to the SRAM 322. Likewise, when the wake event occurs, a latency may be desired and/or required which corresponds to the sum of the fifth to seventh latencies L5 to L7 desired and/or necessary for the APM processor 321 to return the information stored in the SRAM 322 to the first to third special function registers SFR1 to SFR3.

Figure 17:
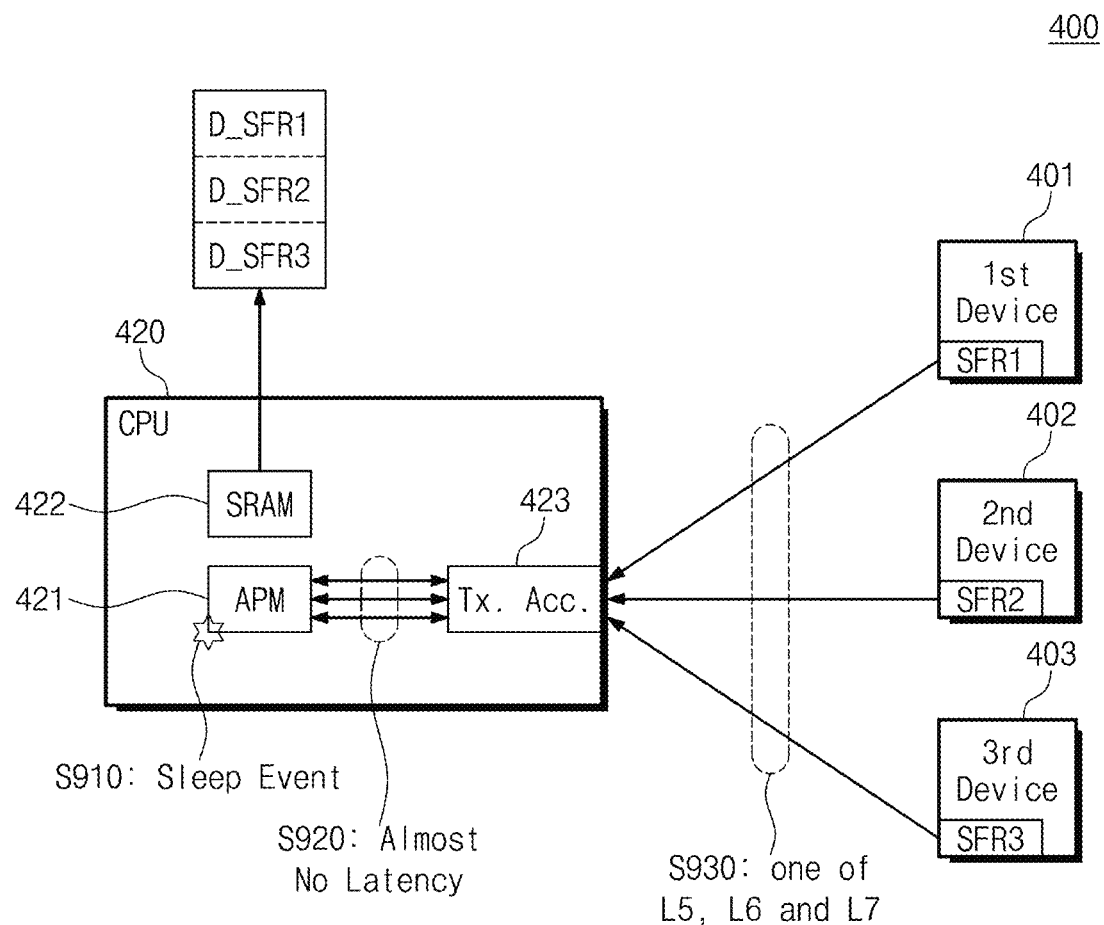
FIG. 17 illustrates an example in which a computing device according to at least one example embodiment of the inventive concepts operates.

FIG. 17 illustrates an example in which a computing device 400 according to at least one example embodiment of the inventive concepts operates. Referring to FIG. 17, the computing device 400 may include a CPU 420, a first device 401, a second device 402, and/or a third device 403, etc., but the example embodiments are not limited thereto.

The CPU 420 may correspond to the CPU 120 of FIG. 1 or the CPU 220 of FIG. 14, but the example embodiments are not limited thereto. The CPU 420 may include an active power management (APM) processor 421, an SRAM 422, and/or a transaction accelerator 423, etc. The APM processor 421 may correspond to the processor 121 of FIG. 1 or the processor 221 of FIG. 14, but the example embodiments are not limited thereto. The SRAM 422 may correspond to the SRAM 122 of FIG. 1 or the SRAM 222 of FIG. 14, but the example embodiments are not limited thereto. The APM processor 421 may control the entering and/or the exiting of a power saving mode and a normal mode of the computing device 400, but is not limited thereto. The transaction accelerator 423 may correspond to the transaction accelerator 123 of FIG. 1 or the transaction accelerator 223 of FIG. 14, but the example embodiments are not limited thereto.

As described with reference to FIG. 16, each of the first device 401, the second device 402, and/or the third device 403, etc., may be implemented with at least one of the main bus 110, the main memory 130, the storage device 140, and the peripheral devices 150 of the computing device 100 of FIG. 1, but the example embodiments are not limited thereto. Additionally, each of the first device 401, the second device 402, and/or the third device 403, etc., may be implemented with at least one of the main bus 210, the main memory 230, the storage device 240, and the peripheral devices 250 of the computing device 200 of FIG. 14, but the example embodiments are not limited thereto.

In operation S910, a sleep event may occur. In operation S920, the APM processor 421 may transmit at least one read transaction request for the first device 401 to the transaction accelerator 423. As described with reference to FIG. 10, the transaction accelerator 423 may transmit and/or immediately transmit at least one read transaction response to the read transaction request to the APM processor 421, but the example embodiments are not limited thereto.

As described with reference to operation S611 and operation S613, operation S621 and operation S623, and operation S631 and operation S633 of FIG. 10, the APM processor 421 and the transaction accelerator 423 may process a series of read transaction operations associated with the first to third special function registers SFR1 to SFR3 of the first to third devices 401 to 403 as being completed, but the example embodiments are not limited thereto.

For example, the APM processor 421 and the transaction accelerator 423 may sequentially issue read transaction operations associated with the first device 401, the second device 402, and/or the third device 403, etc., and may sequentially process the read transaction operations as being completed, but is not limited thereto. Storage spaces corresponding to the first device 401, the second device 402, and/or the third device 403, etc., may be sequentially allocated in the SRAM 422, but is not limited thereto. With regard to operation S920, a latency may almost not exist (and/or may be ignored).

In operation S930, the transaction accelerator 423 may perform the read transaction operations associated with the first device 401, the second device 402, and/or the third device 403, etc. In at least one example embodiment, as described with reference to operation S611 and operation S612, operation S621 and operation S622, and operation S631 and operation S632 of FIG. 10, latencies of the read transaction operations initiated by the transaction accelerator 423 may overlap each other. For example, a latency taken for the CPU 420 to collect all of the special function information from the first device 401, the second device 402, and/or the third device 403, etc., may be determined by one (e.g., the longest latency) of the fifth latency L5, the sixth latency L6, and the seventh latency L7, but the example embodiments are not limited thereto.

When the read transaction operations are completed, special function information D_SFR1 to D_SFR3 from the first device 401, the second device 402, and/or the third device 403, etc., may be stored in the corresponding storage spaces of the SRAM 422, but the example embodiments are not limited thereto.

Figure 18:
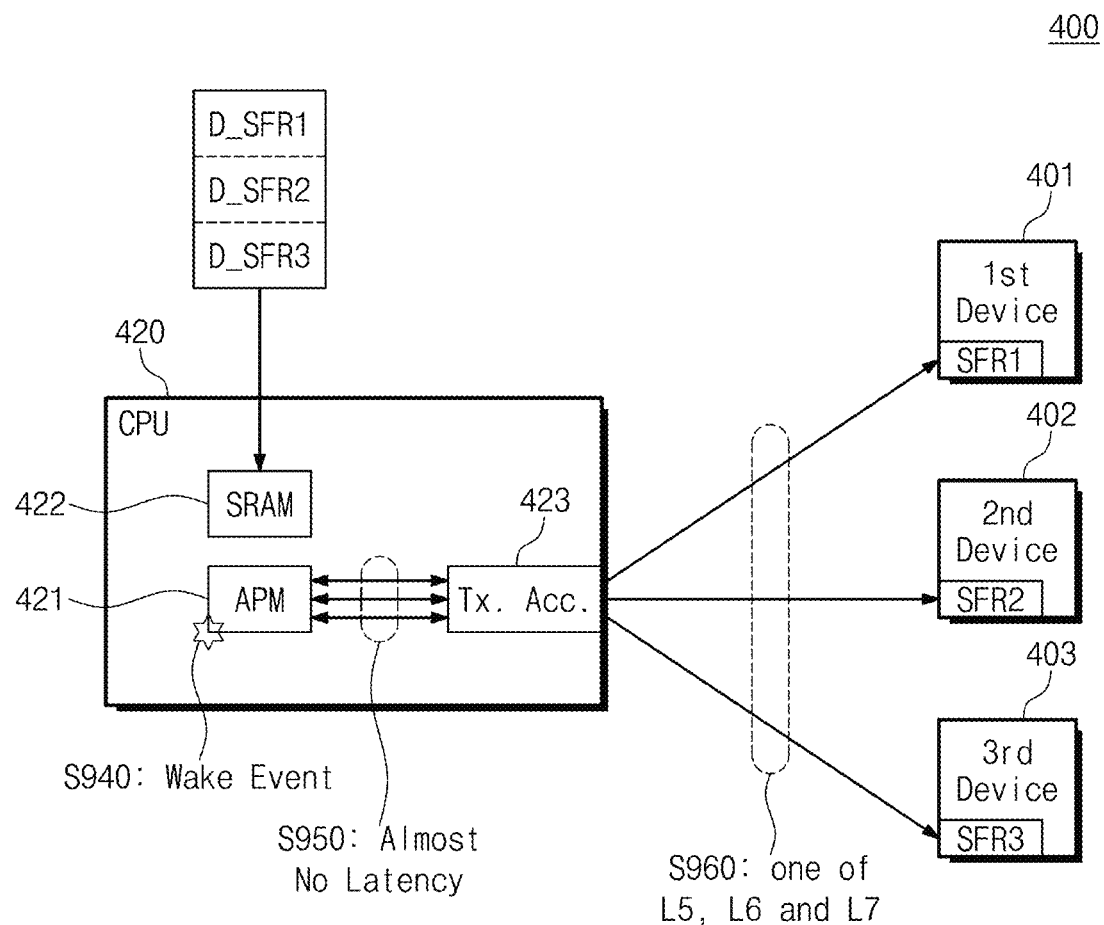
FIG. 18 illustrates an example in which a wake event occurs in a computing device of FIG. 17 according to at least one example embodiment.

FIG. 18 illustrates an example in which a wake event occurs in the computing device 400 of FIG. 17 according to some example embodiments. Referring to FIG. 18, the computing device 400 may include the CPU 420, the first device 401, the second device 402, and/or the third device 403, etc., but is not limited thereto.

In operation S940, a wake event may occur. In response to the wake event, the APM processor 421 may write the special function information D_SFR1 to D_SFR3 in the first to third special function registers SFR1 to SFR3 to restore functions of the first to third devices 401 to 403, but the example embodiments are not limited thereto.

In operation S950, the APM processor 421 may transmit at least one write transaction request for the first device 401 to the transaction accelerator 423. As described with reference to FIG. 5, the transaction accelerator 423 may transmit and/or immediately transmit at least one write transaction response to the write transaction request to the APM processor 421.

As described with reference to operation S311 and operation S313, operation S321 and operation S323, and operation S331 and operation S333 of FIG. 5, the APM processor 421 and the transaction accelerator 423 may process a series of write transaction operations associated with the first to third special function registers SFR1 to SFR3 of the first to third devices 401 to 403 as being completed, but the example embodiments are not limited thereto.

For example, the APM processor 421 and the transaction accelerator 423 may sequentially issue write transaction operations associated with the first device 401, the second device 402, and/or the third device 403, etc., and may sequentially complete the write transaction operations. The special function information D_SFR1 to D_SFR3 may be transmitted together as write data from the storage spaces of the SRAM 422, which correspond to the first device 401, the second device 402, and the third device 403. With regard to operation S950, a latency may almost not exist (and/or may be ignored), but the example embodiments are not limited thereto.

In operation S960, the transaction accelerator 423 may perform the write transaction operations associated with the first device 401, the second device 402, and/or the third device 403, etc., but the example embodiments are not limited thereto. In at least one example embodiment, as described with reference to operation S311 and operation S312, operation S321 and operation S322, and operation S331 and operation S332 of FIG. 5, latencies of the write transaction operations initiated by the transaction accelerator 423 may overlap each other, but the example embodiments are not limited thereto. For example, a latency taken for the CPU 420 to write all the special function information D_SFR1 to D_SFR3 in the first device 401, the second device 402, and/or the third device 403, etc., may be determined by one (e.g., the longest latency) of the fifth latency L5, the sixth latency L6, and the seventh latency L7, but the example embodiments are not limited thereto.

When the write transaction operations are completed, the special function information D_SFR1 to D_SFR3 stored in the storage spaces of the SRAM 422 may be stored in the first to third special function registers SFR1 to SFR3 of the first to third devices 401 to 403, but are not limited thereto. Afterwards, the first to third devices 401 to 403, etc., may start operations in the normal mode.

The transaction accelerator 423 may accelerate the individual access of the CPU 420 to the first to third special function registers SFR1 to SFR3 having different addresses. In comparison with the at least one example embodiment of FIG. 16 where the transaction accelerator 423 is not used, in the example embodiments of FIGS. 17 and 18 where the transaction accelerator 423 is used, a time taken for the computing device 400 to enter the power saving mode from the normal mode and a time taken for the computing device 400 to exit to the normal mode from the power saving mode is reduced. Accordingly, the power consumption of the computing device 400 may be reduced.

Figure 19:
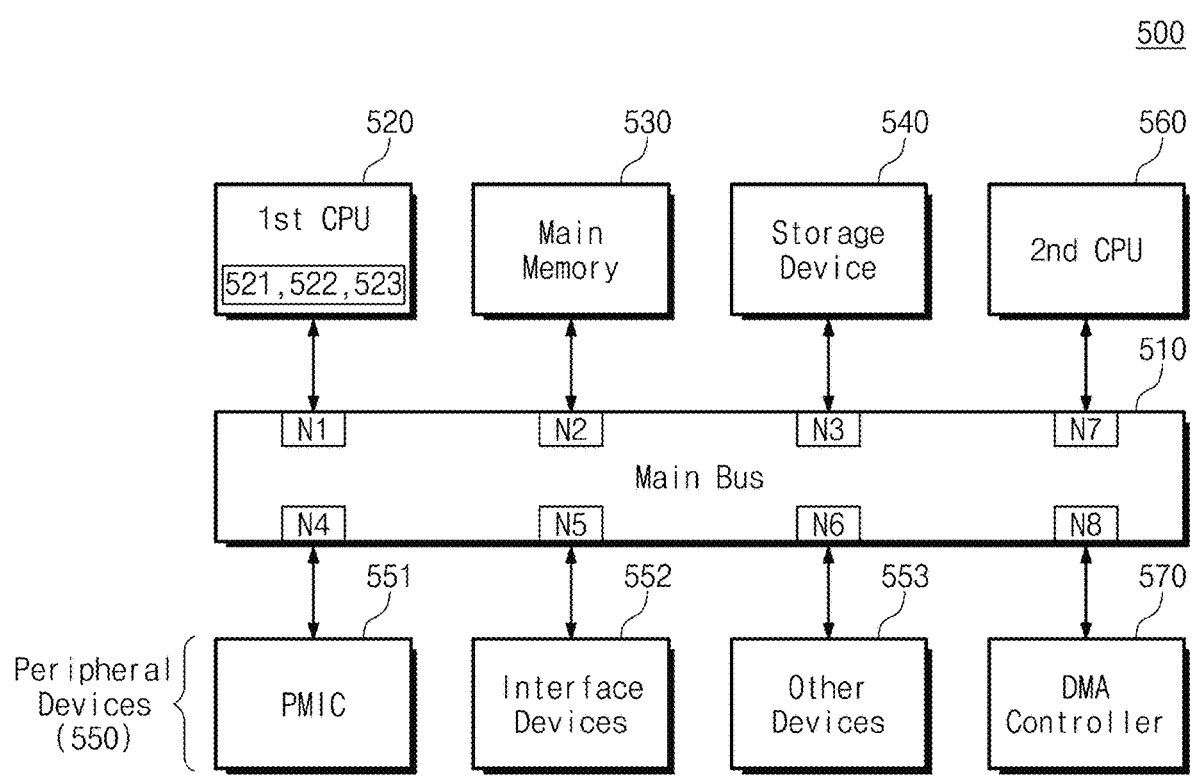
FIG. 19 illustrates a computing device according to at least one example embodiment of the inventive concepts.

FIG. 19 illustrates a computing device 500 according to at least one example embodiment of the inventive concepts. Referring to FIG. 19, the computing device 500 may include a main bus 510, a first central processing unit 520, a main memory 530, a storage device 540, peripheral devices 550, a second central processing unit 560, and/or a DMA controller 570, etc., but the example embodiments are not limited thereto.

A configuration and an operation of the main bus 510 may be the same as the main bus 110 of FIG. 1 or the main bus 210 of FIG. 14 except for further including a seventh node N7 and an eighth node N8, but the example embodiments are not limited thereto. Configurations and operations of the main memory 530, the storage device 540, and the peripheral devices 550 may be the same as those of the main memory 130, the storage device 140, and the peripheral devices 150 described with reference to FIG. 1 or the main memory 230, the storage device 240, and the peripheral devices 250 described with reference to FIG. 14, but the example embodiments are not limited thereto. Thus, additional description will be omitted to avoid redundancy.

The first CPU 520 may correspond to the CPU 120 of FIG. 1 or the CPU 220 of FIG. 14, but the example embodiments are not limited thereto. The first CPU 520 may include at least one processor 521, an SRAM 522, and/or a transaction accelerator 523, etc. The first CPU 520 may be an APM CPU described with reference to FIGS. 17 and 18, but the example embodiments are not limited thereto.

The second CPU 560 may be connected with the seventh node N7 of the main bus 510. The second CPU 560 may include a communication processor (CP) configured to perform wireless communication, but is not limited thereto. The CP may perform paging for base station identification at a period of 1 second or several seconds. For example, during the paging, a channel between the second CPU 560 and the main memory 530 may have to be established.

In the case where the computing device 500 is in the power saving mode, the computing device 500 may repeat an operation of exiting to the normal mode from the power saving mode at the period of 1 second or several seconds for the paging and entering the power saving mode from the normal mode after the paging, etc.

The entrance of the computing device 500 into the power saving mode and the exiting of the computing device 500 to the normal mode may be performed by the first CPU 520, but is not limited thereto. When a time desired and/or necessary for a mode switch performed by the first CPU 520 is reduced (e.g., through the transaction accelerator 523), power consumption may be reduced at the mode switch. Accordingly, the overall power consumption of the computing device 500 may be reduced.

The DMA controller 570 may be connected with the eighth node N8 of the main bus 510, but the example embodiments are not limited thereto. The DMA controller 570 may be programmed by and/or controlled by the first CPU 520 and/or the second CPU 560. The DMA controller 570 may perform a direct memory access (DMA) based on the programmed information (e.g., instructions from the first CPU 520 and/or the second CPU 560, etc.). For example, the DMA controller 570 may transfer data between the storage device 540 and/or the peripheral devices 550 and the main memory 530, but the example embodiments are not limited thereto.

In at least one example embodiment, when at least one transaction request is transmitted from the processor 521 of the first CPU 520, the transaction accelerator 523 may transmit at least one transaction response indicating a transaction completion to the processor 521. The transaction accelerator 523 may process the transaction request during a time when the processor 521 does not recognize the processing of the transaction request. That is, the transaction accelerator 523 may shadow the transaction operation actually performed, such that the processor 521 does not recognize the transaction operation, but the example embodiments are not limited thereto.

On the other hand, the DMA controller 570 may perform an access depending on the information programmed by the CPU 520 and/or 560 and may then notify the CPU 520 and/or 560 that the access is completed. That is, the DMA controller 570 may instead process tasks, which the CPU 520 and/or 560 may process, under recognition of the CPU 520 and/or 560, etc.

As described above, because the transaction accelerator 523 and the DMA controller 570 are different in characteristic, the transaction accelerator 523 should not be regarded as being equivalent to the DMA controller 570. However, it may be understood that the transaction accelerator 523 according to at least one example embodiment of the inventive concepts may be coupled with the DMA controller 570 to accelerate transaction operations caused by the DMA controller 570, but the example embodiments are not limited thereto.

In FIGS. 1, 14, and 19, the connections between the main bus 110, 210, or 510 and the components of the computing device 100, 200, or 500 are illustrated and described by ways of example. However, a bus of the computing device 100, 200, or 500 according to at least one example embodiment of the inventive concepts may be composed of two or more layers or may be composed of two or more heterogeneous buses. The bus of the computing device 100, 200, or 500 according to at least one example embodiment of the inventive concepts is not limited to the main bus 110, 210, or 510 described with reference to FIG. 1, 14, or 19.

Figure 20:
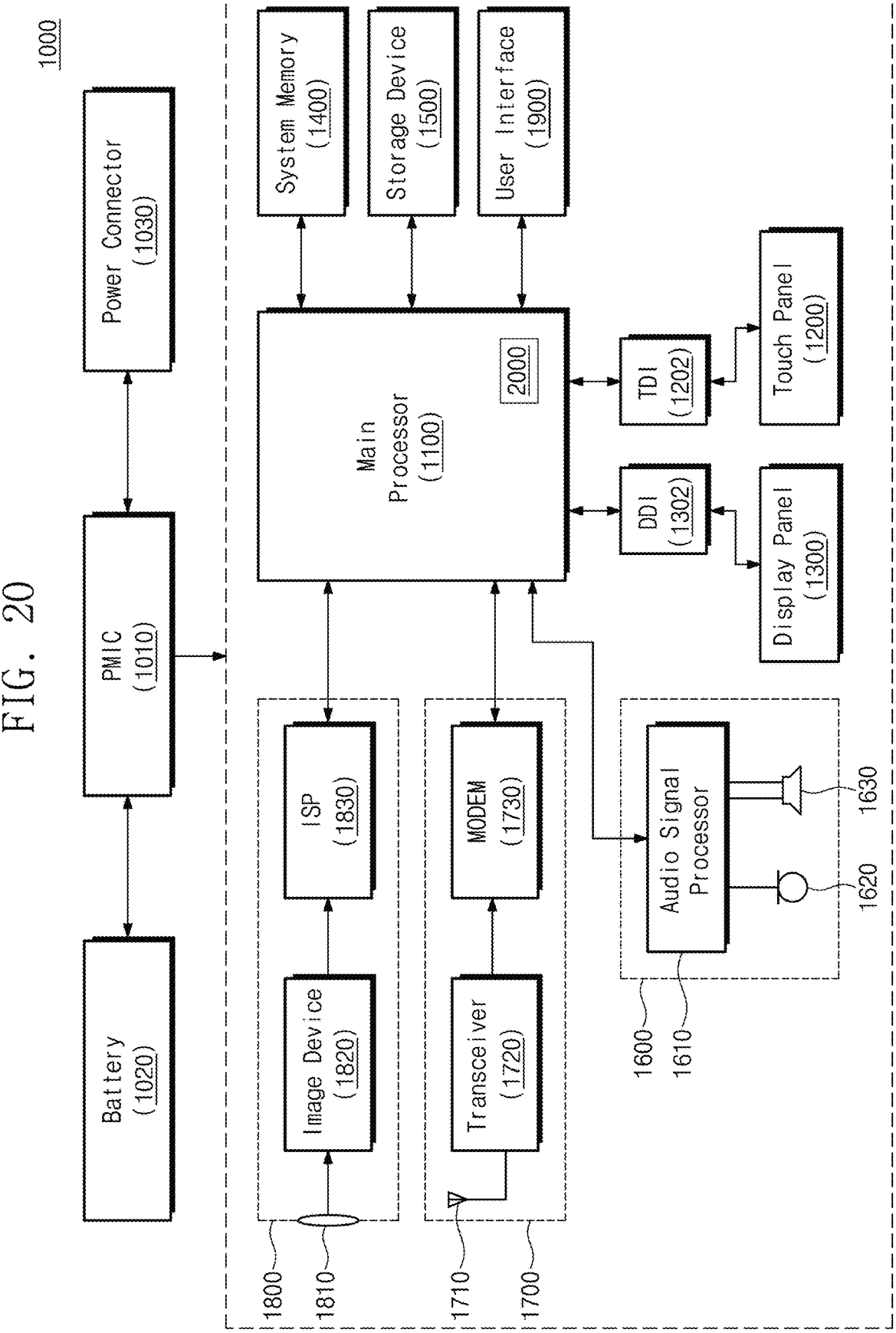
FIG. 20 illustrates an example of a computing device according to at least one example embodiment of the inventive concepts.

FIG. 20 illustrates an example of a computing device 1000 according to at least one example embodiment of the inventive concepts. Referring to FIG. 20, the computing device 1000 may include at least one main processor 1100, a touch panel 1200, a touch driver integrated circuit (TDI) 1202, a display panel 1300, a display driver integrated circuit (DDI) 1302, a system memory 1400, a storage device 1500, an audio processor 1600, a communication block 1700, an image processor 1800, and/or a user interface 1900, etc., but is not limited thereto. In at least one example embodiment, the computing device 1000 may be one of various electronic devices such as a personal computer, a laptop computer, a server, a workstation, a portable communication terminal, a personal digital assistant (PDA), a portable media player (PMP), a digital camera, a smartphone, a tablet computer, and/or a wearable device, etc.

The main processor 1100 may control overall operations of the computing device 1000. The main processor 1100 may control/manage operations of the components of the computing device 1000, etc. The main processor 1100 may process various operations for the purpose of operating the computing device 1000. The main processor 1100 may include a transaction accelerator 2000 according to at least one example embodiment of the inventive concepts. The transaction accelerator 2000 may be connected with at least one of the processors and/or central processing units in the main processor 1100 to increase the number of parallel transaction operations, etc.

The touch panel 1200 may be configured to sense a touch input from a user under control of the touch driver integrated circuit 1202, etc. The display panel 1300 may be configured to display image information under control of the display driver integrated circuit 1302, etc.

The system memory 1400 may store data that are used in an operation of the computing device 1000, etc. For example, the system memory 1400 may include a volatile memory such as a static random access memory (SRAM), a dynamic RAM (DRAM), and/or a synchronous DRAM (SDRAM), etc., and/or a nonvolatile memory such as a phase-change RAM (PRAM), a magneto-resistive RAM (MRAM), a resistive RAM (ReRAM), and/or a ferroelectric RAM (FRAM), etc.

The storage device 1500 may store data regardless of whether power is supplied. For example, the storage device 1500 may include at least one of various nonvolatile memories, such as a flash memory, a PRAM, an MRAM, a ReRAM, and/or a FRAM, etc. For example, the storage device 1500 may include an embedded memory and/or a removable memory of the computing device 1000, etc.

The audio processor 1600 may process an audio signal by using an audio signal processor 1610. The audio processor 1600 may receive an audio input through a microphone 1620 and/or may provide an audio output through a speaker 1630. The communication block 1700 may exchange signals with an external device/system through an antenna 1710 and/or using a wired connection, etc. A transceiver 1720 and/or a modulator/demodulator (MODEM) 1730 of the communication block 1700 may process signals exchanged with the external device/system, based on at least one of various wireless communication protocols: long term evolution (LTE), worldwide interoperability for microwave access (WiMax), global system for mobile communication (GSM), code division multiple access (CDMA), Bluetooth, near field communication (NFC), wireless fidelity (Wi-Fi), and/or radio frequency identification (RFID), etc., and/or using a wired communication protocol, such as Ethernet, universal serial bus (USB), etc.

The image processor 1800 may receive a light through a lens 1810. An image device 1820 and an image signal processor (ISP) 1830 included in the image processor 1800 may generate image information about an external object, based on a received light. The user interface 1900 may include an interface capable of exchanging information with a user, except for the touch panel 1200, the display panel 1300, the audio processor 1600, and/or the image processor 1800, etc. The user interface 1900 may include a keyboard, a mouse, a printer, a projector, various sensors, a human body communication device, etc.

The computing device 1000 may further include a power management IC (PMIC) 1010, a battery 1020, and/or a power connector 1030, etc. The power management IC 1010 may generate an internal power from a power supplied from the battery 1020 and/or a power supplied from the power connector 1030, and may provide the internal power to the main processor 1100, the touch panel 1200, the touch driver integrated circuit (TDI) 1202, the display panel 1300, the display driver integrated circuit (DDI) 1302, the system memory 1400, the storage device 1500, the audio processor 1600, the communication block 1700, the image processor 1800, and/or the user interface 1900, etc.

In the above example embodiments, components according to the inventive concepts are described by using the terms "first", "second", "third", and the like. However, the terms "first", "second", "third", and the like may be used to distinguish components from each other and do not limit the example embodiments of the inventive concepts. For example, the terms "first", "second", "third", and the like do not involve an order or a numerical meaning of any form.

In the above example embodiments, components according to example embodiments of the inventive concepts are described by using blocks and/or units. The blocks and/or units may be implemented with various hardware devices, such as an integrated circuit, an application specific IC (ASIC), a field programmable gate array (FPGA), and/or a complex programmable logic device (CPLD), etc., may be firmware driven and/or executed in hardware devices, and/or a combination of a hardware device executing software. Also, the blocks and/or units may include circuits implemented with semiconductor elements in an integrated circuit or circuits enrolled as intellectual property (IP).

According to at least one example embodiment of the inventive concepts, a transaction accelerator may increase the number of parallel transaction operations performed by a processor. Accordingly, an operating method of a transaction accelerator making a transaction speed of a processor higher, an operating method of a computing device including the transaction accelerator, and/or a computing device including the transaction accelerator are provided.

While various example embodiments of the inventive concepts has been described, it will be apparent to those of ordinary skill in the art that various changes and modifications may be made thereto without departing from the spirit and scope of the inventive concepts as set forth in the following claims.

What is claimed is:

1. An operation method of a transaction accelerator connected between at least one host device and a bus, the method comprising:
   receiving a first transaction request from the at least one host device, the transaction request including a destination address, the destination address indicating a component in the bus or a component connected to the bus as a destination component for the first transaction request, the destination component external to the at least one host device;
   transmitting the first transaction request to the bus; and
   transmitting a first transaction response corresponding to the first transaction request to the at least one host device in response to the transmitting the first transaction request to the bus.

2. The method of claim 1, wherein the transmitting the first transaction response to the at least one host device further includes:
   transmitting the first transaction response to the at least one host device before a first transaction with the destination component is completed in response to the first transaction request.

3. The method of claim 1, wherein
   the first transaction request includes a write transaction request; and
   the method further comprises,
      storing an identifier of the first transaction request in memory associated with the transaction accelerator in response to the transmitting the first transaction request to the bus.

4. The method of claim 3, further comprising:
   receiving a second transaction response corresponding to the first transaction request from the bus; and
   clearing the identifier of the first transaction request in response to the received second transaction response.

5. The method of claim 3, wherein
   the transaction accelerator includes a plurality of transaction slots; and
   the method further comprises,
      receiving a plurality of transaction requests from the at least one host device, the plurality of transaction requests including the first transaction request,
      storing a plurality of identifiers corresponding to the plurality of transaction requests in the plurality of transaction slots, respectively,
      receiving a second transaction response from the bus, and
      clearing an identifier corresponding to the second transaction response from among the plurality of identifiers.

6. The method of claim 5, further comprising:
   determining whether at least one transaction slot of the plurality of transaction slots is empty;
   permitting reception of a new transaction request from the at least one host device based on results of the determining indicating the at least one transaction slot is empty; and
   prohibiting the reception of the new transaction request from the at least one host device based on the results of the determining indicating the plurality of transaction slots are full.

7. The method of claim 1, wherein
   the first transaction request includes a read transaction request; and
   the first transaction response includes garbage data as read data.

8. The method of claim 7, further comprising:
   storing an identifier of the first transaction request in memory associated with the transaction accelerator in response to the transmitting the first transaction request to the bus.

9. The method of claim 8, further comprising:
   receiving a second transaction response corresponding to the first transaction request from the bus;
   storing read data included in the received second transaction response; and
   clearing the identifier of the first transaction request.

10. The method of claim 7, wherein
the transaction accelerator includes a plurality of transaction slots; and
the method further comprises,
receiving a plurality of transaction requests from the at least one host device, the plurality of transaction requests including the first transaction request;
storing a plurality of identifiers corresponding to the plurality of transaction requests in the plurality of transaction slots, respectively and
allocating a plurality of storage spaces corresponding to the plurality of transaction requests, respectively, in a memory.

11. The method of claim 10, wherein sizes of the plurality of storage spaces are identical.

12. The method of claim 10, wherein the allocating of the plurality of storage spaces in the memory includes:
allocating the plurality of storage spaces corresponding to the plurality of transaction requests in the memory based on an order of receiving the plurality of transaction requests.

13. The method of claim 10, further comprising:
receiving a second transaction response from the bus;
storing read data included in the second transaction response in a storage space corresponding to the second transaction response from among the plurality of storage spaces; and
clearing an identifier corresponding to the second transaction response from among the plurality of identifiers.

14. The method of claim 1, wherein the at least one host device includes:
at least one processor; and
a second bus connected between the at least one processor and the transaction accelerator.

15. An operating method of a computing device which includes at least one processor, a bus, a transaction accelerator, and a plurality of peripheral devices, each of the peripheral devices of the plurality of peripheral device being external to the at least one processor, the method comprising:
transmitting, by the at least one processor, a first read transaction request to the transaction accelerator, the first read transaction request including a destination address, the destination address indicating at least one peripheral device of the plurality of peripheral device in the bus or at least one peripheral device of the plurality of peripheral devices connected to the bus as a destination component for the first read transaction request;
transmitting, by the transaction accelerator, a first read transaction response to the at least one processor, the first read transaction response corresponding to the first read transaction request;
transmitting, by the at least one processor, a second read transaction request to the transaction accelerator in response to the first read transaction response;
transmitting, by the transaction accelerator, a second read transaction response corresponding to the second read transaction request to the at least one processor; and
transmitting, by the transaction accelerator, the first read transaction request and the second read transaction request to the at least one peripheral device of the plurality of peripheral devices.

16. The method of claim 15, further comprising:
receiving, by the transaction accelerator, a third read transaction response corresponding to the first read transaction request from the at least one peripheral device;
storing, by the transaction accelerator, first read data included in the third read transaction response in a memory;
receiving, by the transaction accelerator, a fourth read transaction response corresponding to the second read transaction request from the at least one peripheral device; and
storing, by the transaction accelerator, second read data included in the fourth read transaction response in the memory.

17. The method of claim 16, further comprising:
transmitting, by the at least one processor, a first write transaction request to the transaction accelerator;
transmitting, by the transaction accelerator, a first write transaction response to the at least one processor, the first write transaction response corresponding to the first write transaction request;
transmitting, by the at least one processor, a second write transaction request to the transaction accelerator in response to the first write transaction response;
transmitting, by the transaction accelerator, a second write transaction response to the at least one processor, the second write transaction response corresponding to the second write transaction request; and
transmitting, by the transaction accelerator, the first write transaction request and the second write transaction request to the at least one peripheral device of the plurality of peripheral devices.

18. The method of claim 17, wherein
the first write transaction request is transmitted to the at least one peripheral device with the first read data stored in the memory; and
the second write transaction request is transmitted to the at least one peripheral device with the second read data stored in the memory.

19. A computing device comprising:
a bus;
a plurality of peripheral devices connected to the bus; and
a central processing unit (CPU) connected to the bus, the CPU configured to control the plurality of peripheral devices through the bus, the plurality of peripheral device external to the CPU,
the CPU including,
at least one processor core, and
a transaction accelerator including two or more transaction slots, the transaction accelerator configured to,
receive a first transaction request from the at least one processor core, the first transaction request including a destination address, the destination address indicating at least one peripheral device of the plurality of peripheral devices as a destination component for the first transaction request,
transmit a first transaction response to the at least one processor core in response to the received first transaction request,
transfer the first transaction request to the bus, and
store information related to the first transaction request in one of the two or more transaction slots until the first transaction request is completed.

* * * * *